(12) United States Patent
Nakajima et al.

(10) Patent No.: US 10,113,874 B2
(45) Date of Patent: Oct. 30, 2018

(54) DETECTION DEVICE, SENSOR, ELECTRONIC APPARATUS AND MOVING OBJECT

(71) Applicant: Seiko Epson Corporation, Tokyo (JP)

(72) Inventors: Katsuhito Nakajima, Hachioji (JP); Katsuhiko Maki, Chino (JP)

(73) Assignee: Seiko Epson Corporation (JP)

( * ) Notice: Subject to any disclaimer, the term of this patent is extended or adjusted under 35 U.S.C. 154(b) by 590 days.

(21) Appl. No.: 14/560,376

(22) Filed: Dec. 4, 2014

(65) Prior Publication Data

US 2015/0160011 A1 Jun. 11, 2015

(30) Foreign Application Priority Data

Dec. 5, 2013 (JP) .................. 2013-251778

(51) Int. Cl.
| | |
|---|---|
| *G01C 19/5776* | (2012.01) |
| *G01C 19/5712* | (2012.01) |
| *G01C 19/5726* | (2012.01) |
| *G01C 19/56* | (2012.01) |
| *G01C 19/5719* | (2012.01) |
| *G01C 19/00* | (2013.01) |

(52) U.S. Cl.
CPC ......... *G01C 19/5776* (2013.01); *G01C 19/00* (2013.01); *G01C 19/56* (2013.01); *G01C 19/5712* (2013.01); *G01C 19/5719* (2013.01); *G01C 19/5726* (2013.01)

(58) Field of Classification Search
CPC .................................................. G01C 19/5776
USPC ........................................................... 702/56
See application file for complete search history.

(56) References Cited

U.S. PATENT DOCUMENTS

| | | | | |
|---|---|---|---|---|
| 5,410,366 A | * | 4/1995 | Hostetler | ................. H04N 5/18 348/691 |
| 5,600,063 A | | 2/1997 | Ogawa | |
| 5,731,519 A | | 3/1998 | Ogawa | |
| 5,932,802 A | | 8/1999 | Ogawa | |
| 2001/0007151 A1 | * | 7/2001 | Vorenkamp | ......... H01F 17/0006 725/151 |
| 2002/0156820 A1 | * | 10/2002 | Kishi | ................. H03H 17/0275 708/300 |
| 2007/0261488 A1 | * | 11/2007 | Murashima | ........ G01C 19/5607 73/504.04 |

(Continued)

FOREIGN PATENT DOCUMENTS

| | | |
|---|---|---|
| JP | 08-061958 A | 3/1996 |
| JP | 2007-187606 A | 7/2007 |

(Continued)

*Primary Examiner* — Ly D Pham
(74) *Attorney, Agent, or Firm* — Harness, Dickey & Pierce, P.L.C.

(57) ABSTRACT

A detection device includes: a drive circuit that receives a feedback signal from a vibrator and drives the vibrator; a detection circuit that performs detection based on a signal from the vibrator and outputs detection data; and a digital signal processing unit that performs digital filtering for the detection data from the detection circuit. The digital signal processing unit performs band elimination filtering for attenuating a component of a detuning frequency $\Delta f=|fd-fs|$ corresponding to a difference between a drive side resonance frequency fd and a detection side resonance frequency fs of the vibrator for the detection data.

8 Claims, 18 Drawing Sheets

(56) References Cited

U.S. PATENT DOCUMENTS

| | | | |
|---|---|---|---|
| 2008/0111585 A1* | 5/2008 | Fukuzawa | G01C 19/5607 327/41 |
| 2008/0111625 A1* | 5/2008 | Fukuzawa | G01C 19/5607 330/254 |
| 2009/0125575 A1* | 5/2009 | Aikawa | G01D 3/032 708/300 |
| 2010/0091688 A1* | 4/2010 | Staszewski | H03D 7/1441 370/277 |
| 2010/0237909 A1 | 9/2010 | Inukai et al. | |
| 2012/0179294 A1 | 7/2012 | Sasai | |
| 2013/0282205 A1* | 10/2013 | Bailly | B64D 43/00 701/3 |
| 2014/0040653 A1* | 2/2014 | Etkin | G06F 1/12 713/500 |
| 2015/0020590 A1* | 1/2015 | Painter | G01P 15/093 73/514.26 |

FOREIGN PATENT DOCUMENTS

| | | |
|---|---|---|
| JP | 2007-327943 A | 12/2007 |
| JP | 2008-070333 A | 3/2008 |
| JP | 2008-256668 A | 10/2008 |
| JP | 2009-258009 A | 11/2009 |
| JP | 2012-139807 A | 7/2012 |
| JP | 2013-051553 A | 3/2013 |

* cited by examiner

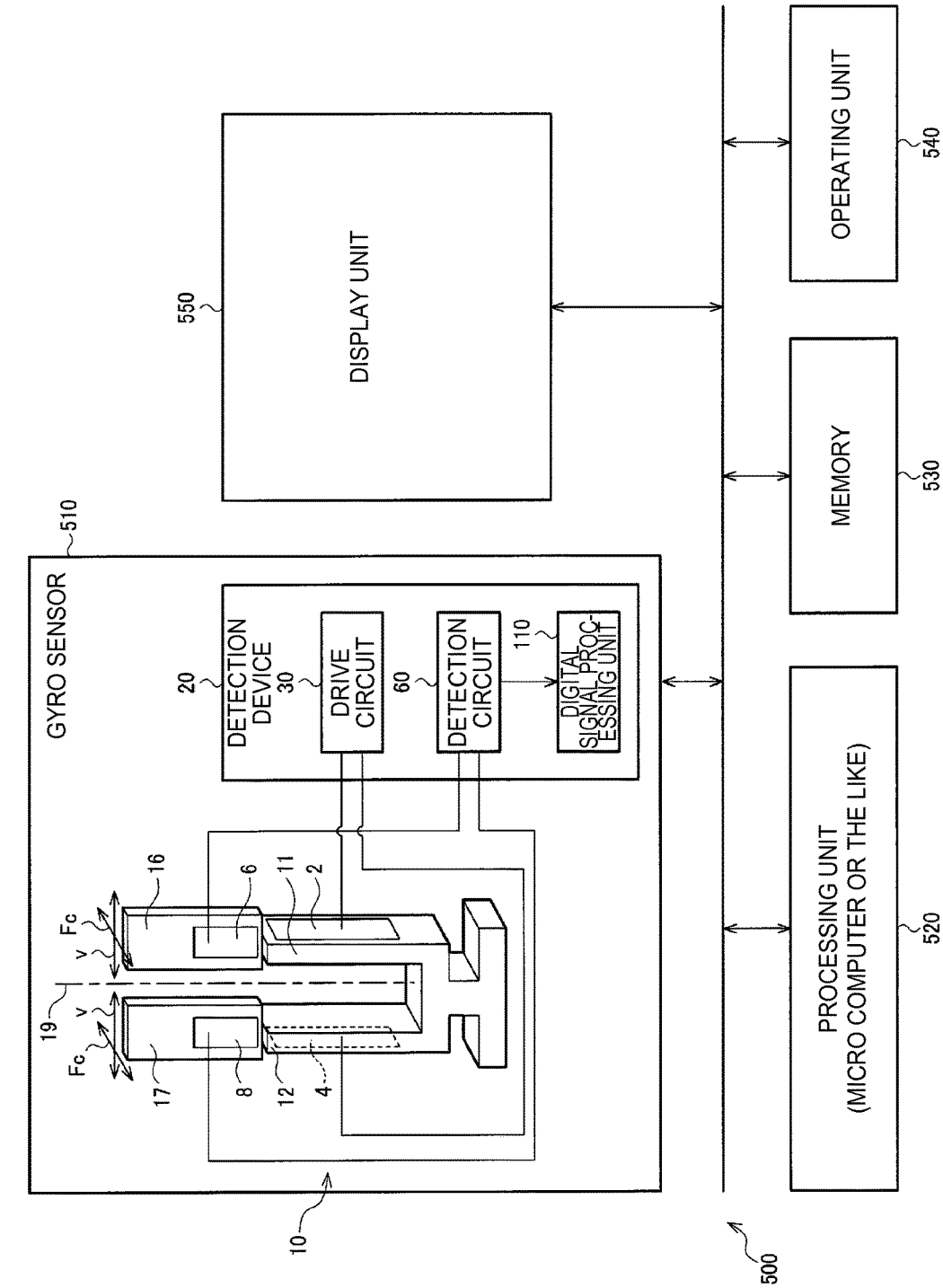

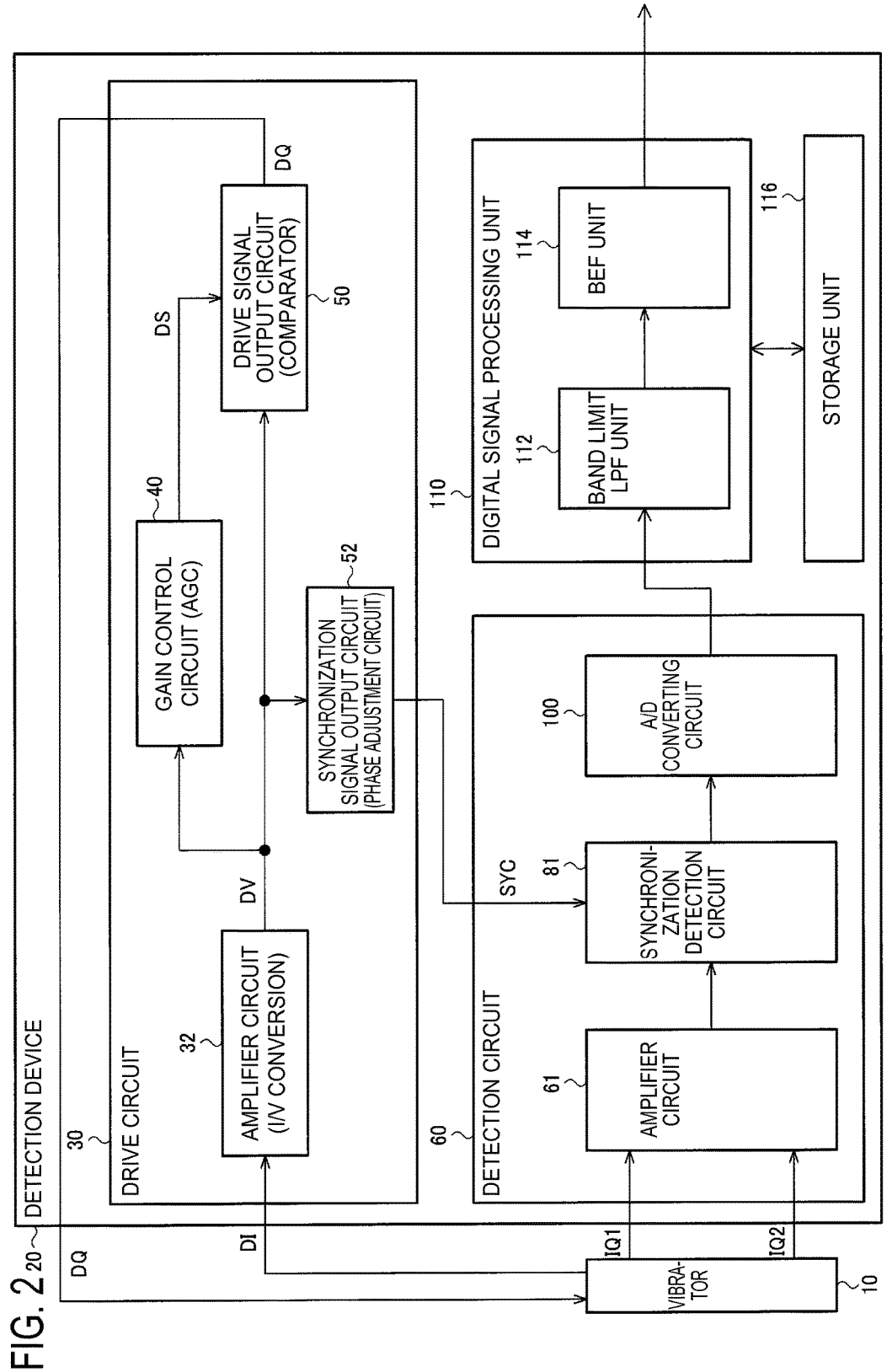

| VIBRATOR | DISCRETE FREQUENCY | FILTER COEFFICIENT |
|---|---|---|
| VIBRATOR A | 800Hz±300Hz | CFA |
| VIBRATOR B | 900Hz±200Hz | CFB |
| VIBRATOR C | 950Hz±250Hz | CFC |
| ⋮ | ⋮ | ⋮ |

DETECTION DEVICE, SENSOR, ELECTRONIC APPARATUS AND MOVING OBJECT

BACKGROUND

1. Technical Field

The present invention relates to a detection device, a sensor, an electronic apparatus, a moving object and the like.

2. Related Art

A gyro sensor for detecting a physical quantity that changes due to external factors is assembled in an electronic apparatus such as a digital camera or a smart phone, or a moving object such as a vehicle or an airplane. The gyro sensor detects a physical quantity such as an angular velocity, and is used for image stabilization, posture control, GPS autonomous navigation or the like.

For example, a vibration gyro sensor such as a quartz crystal piezoelectric vibration gyro sensor is known as one of the gyro sensors. In the vibration gyro sensor, a physical quantity corresponding to a Coriolis force generated by rotation is detected.

In such a vibration gyro sensor, an unnecessary signal of a detuning frequency due to mechanical vibration such as a disturbance is generated. As a related art technique for removing the unnecessary signal of the detuning frequency, for example, techniques disclosed in JP-A-2007-327943, JP-A-2008-256668, and JP-A-2007-18706 are known.

JP-A-2007-327943 discloses a technique for attenuating a component of a detuning frequency by a low pass filter of a switched capacitor filter (SCF) provided at a subsequent stage of a synchronization detection circuit to remove an unnecessary signal of the detuning frequency.

JP-A-2008-256668 discloses a technique for inputting a signal subjected to synchronization detection to a noise removal unit configured by serially connecting a Butterworth filter and a Chebyshev filter, to thereby remove an unnecessary signal of a detuning frequency.

JP-A-2007-18706 discloses a technique for generating a detuning frequency signal of the same frequency as that of an unnecessary signal of a detuning frequency and subtracting a signal obtained by gain-adjusting the detuning frequency signal from the original signal, to thereby remove the unnecessary signal of the detuning frequency.

However, if a low pass filter with a low cutoff frequency is used in order to remove the unnecessary signal of the detuning frequency, a signal band becomes narrow. Further, in order to attenuate the component of the detuning frequency by increasing the cutoff frequency to secure the signal band, a high-order filter is necessary, which causes a large amount of signal delay in the signal band. In addition, in a method for generating the detuning frequency signal of the same frequency as that of the unnecessary signal of the detuning frequency and then subtracting the signal from the original signal, a circuit becomes complicated, and a circuit size becomes large, which increases the cost.

SUMMARY

An advantage of some aspects of the invention is to provide a detection device, a sensor, an electronic apparatus, a moving object, and the like capable of effectively attenuating a component of a detuning frequency while preventing signal delay or the like.

An aspect of the invention relates to a detection device including a drive circuit that receives a feedback signal from a vibrator and drives the vibrator; a detection circuit that performs detection based on a signal from the vibrator and outputs detection data; and a digital signal processing unit that performs digital filtering for the detection data from the detection circuit. The digital signal processing unit performs band elimination filtering for attenuating a component of a detuning frequency $\Delta f=|fd-fs|$ corresponding to a difference between a drive side resonance frequency fd and a detection side resonance frequency fs of the vibrator for the detection data.

According to this aspect of the invention, the drive circuit drives the vibrator, and the detection circuit performs the detection and outputs the detection data. Further, the digital signal processing unit performs the band elimination filtering for attenuating the component of the detuning frequency as the digital filtering for the detection data. If such a band elimination filter is used, by setting a center frequency of the band elimination filter to a frequency corresponding to the detuning frequency, it is possible to efficiently attenuate the component of the detuning frequency. Further, if the band elimination filter is used, it is possible to prevent signal delay or the like in a signal band, compared with a method for removing the unnecessary signal of the detuning frequency by a high-order low pass filter or the like. Accordingly, it is possible to provide the detection device capable of effectively attenuating the component of the detuning frequency while preventing the signal delay or the like.

In the aspect of the invention, the storage unit may store information on a filter coefficient for setting a frequency characteristic of the band elimination filter.

With such a configuration, the detection device can read the filter coefficient from the storage unit, and can attenuate the component of the detuning frequency by the band elimination filter in which the read filter coefficient is set.

In the aspect of the invention, the storage unit may store information on the plural filter coefficients so that each filter coefficient corresponds to each of the plural vibrators.

With such a configuration, even when characteristics of the respective detuning frequencies of the respective plural vibrators are different from each other, by storing each filter coefficient based on the characteristic of each detuning frequency in the storage unit, it is possible to handle the problem.

In the aspect of the invention, the digital signal processing unit may perform band limit low pass filtering in which a cutoff frequency is variable, and when a variable range of the cutoff frequency of the low pass filter is represented as fca to fcb and a center frequency of the band elimination filter is represented as fm, the relationship of fca<fm<fcb may be satisfied.

With such a configuration, the variable range fca to fcb of the cutoff frequency of the band limit low pass filter can be set to a wide range in which the relationship of fca<fm<fcb is satisfied, and thus, the band width of the wide range can be set. Further, even when the component of the unnecessary signal of the detuning frequency is present in the set band width, the component of the unnecessary signal can be attenuated by the band elimination filter.

In the aspect of the invention, the digital signal processing unit may include a band elimination filter unit. The band elimination filter unit may include: a multiplier that performs multiplication of any one of input data and output data, and any one of the plurality of filter coefficients of the band elimination filter, a multiplication result register that stores multiplication result data of the multiplier, first and second addition result registers, and an adder that performs addition of any one of the input data and a value of the multiplication result register, and any one of the input data, a value of the first register and a value of the second register, and outputs addition result data to the first and second registers.

With such a configuration, it is possible to reduce the circuit size, compared with a method for performing band elimination filtering by providing plural multipliers and plural adders. Further, for example, by employing a pipeline method for simultaneously operating the multipliers and the adders, it is possible to suppress the number of sequences of the band elimination filtering to the minimum.

In the aspect of the invention, the detection device may further include an interface unit that outputs output data to the outside asynchronous to an output timing of the detection data of the digital signal processing unit.

With such a configuration, an external processing unit or the like can obtain output data corresponding to the detection data at a timing that does not depend on the output timing of the detection data of the digital signal processing unit. Further, if such re-sampling of the output data is performed, the component of the unnecessary signal of the detuning frequency is folded into the signal band to reduce the detection performance, but by performing the band elimination filtering, such a problem can be prevented.

Another aspect of the invention relates to a detection device including: a first drive circuit that receives a first feedback signal from a first vibrator for detecting a rotational angular velocity around a first axis and drives the first vibrator at a first drive side resonance frequency fd1; a first detection circuit that performs detection based on a signal from the first vibrator and outputs first detection data; a second drive circuit that receives a second feedback signal from a second vibrator for detecting a rotational angular velocity around a second axis and drives the second vibrator at a second drive side resonance frequency fd2 different from the first drive side resonance frequency fd1; a second detection circuit that performs detection based on a signal from the second vibrator and outputs second detection data; and a digital signal processing unit that performs digital filtering for the first detection data and the second detection data. The digital signal processing unit performs first band elimination filtering for attenuating a component of a first detuning frequency Δf1=|fd1−fs1| corresponding to a difference between the drive side resonance frequency fd1 and a detection side drive frequency fs1 of the first vibrator for the first detection data, and performs second band elimination filtering, which is different from the first band elimination filtering in the frequency characteristic, for attenuating a component of a second detuning frequency Δf2=|fd2−fs2| corresponding to a difference between the drive side resonance frequency fd2 and a detection side drive frequency fs2 of the second vibrator for the second detection data.

With such a configuration, even when vibration frequencies of the first vibrator and the second vibrator are set to be different from each other in order to prevent inter-axis interference or the like and characteristics of the detuning frequencies of the first vibrator and the second vibrator are different from each other, the components of the detuning frequencies for the first vibrator and the second vibrator can be attenuated.

In the aspect of the invention, the detection device may further include a storage unit that stores information on a first filter coefficient for setting a frequency characteristic of the first band elimination filter, and information on a second filter coefficient for setting a frequency characteristic of the second band elimination filter.

With such a configuration, by performing the first band elimination filtering in which the first filter coefficient is set for the first detection data for the first vibrator, the component of the first detuning frequency can be attenuated. Further, by performing the second band elimination filtering in which the second filter coefficient is set for the second detection data for the second vibrator, the component of the second detuning frequency can be attenuated.

Still another aspect of the invention relates to a sensor including the detection device described above and the vibrator described above.

Yet another aspect of the invention relates to a sensor including: the first vibrator described above; and the second vibrator described above.

Still yet another aspect of the invention relates to an electronic apparatus including the detection device described above.

Further another aspect of the invention relates to a moving object including the detection device described above.

BRIEF DESCRIPTION OF THE DRAWINGS

The invention will be described with reference to the accompanying drawings, wherein like numbers reference like elements.

FIG. 1 is a diagram illustrating a configuration example of a detection device, an electronic apparatus, and a gyro sensor of an embodiment of the invention.

FIG. 2 is a diagram illustrating a detailed configuration example of the detection device.

DESCRIPTION OF EXEMPLARY EMBODIMENTS

Figure 3A:
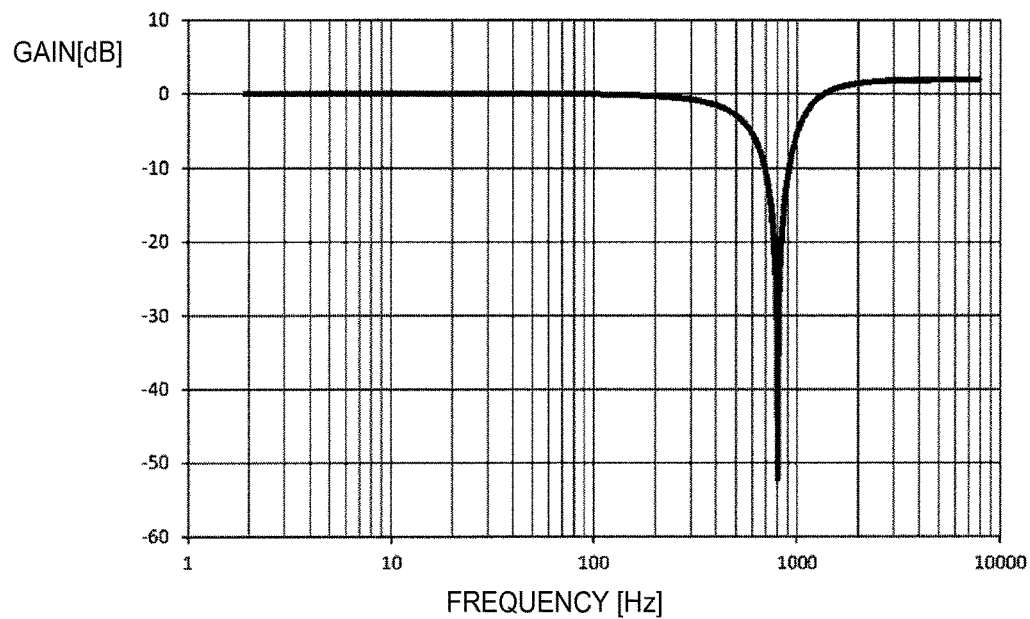
FIGS. 3A and 3B are diagrams illustrating gain characteristics of a band elimination filter.

Hereinafter, preferred embodiments of the invention will be described in detail. The embodiments to be described herein do not improperly limit the content of the invention disclosed in the appended claims. Further, not all components described in the embodiments are not essential components of the invention. For example, hereinafter, an example in which a vibrator is a piezoelectric vibrator (vibration gyroscope) and a sensor is a gyro sensor is used, but the invention is not limited thereto. For example, the invention may be applied to a vibrator (vibration gyroscope) of an electrostatic capacitance detection type formed of a silicon substrate or the like, a sensor or the like that detects a physical quantity equivalent to angular velocity information or a physical quantity other than the angular velocity information.

1. Electronic Apparatus, Gyro Sensor

FIG. 1 shows a configuration example of a gyro sensor 510 (sensor in a broad sense) that includes a detection device 20 of an embodiment of the invention, and an electronic apparatus 500 that includes the gyro sensor 510. The electronic apparatus 500 and the gyro sensor 510 are not limited to the configuration of FIG. 1, and various modifications such as an omission of a part of the components or an addition of other components may be made. Further, as the electronic apparatus 500 of the present embodiment, various devices such as a digital camera, a video camera, a smart phone, a portable phone, a car navigation system, a robot, a game machine, a clock, a health device, or a personal digital assistance may be used.

The electronic apparatus 500 includes the gyro sensor 510 and a processing unit 520. Further, the electronic apparatus 500 may include a memory 530, an operating unit 540, and a display unit 550. The processing unit 520 (CPU, MPU or the like) controls the gyro sensor 510 or the like, or generally controls the electronic apparatus 500. Then, the processing unit 520 performs processing based on angular velocity information (physical quantity in a broad sense) detected by the gyro sensor 510. For example, the processing unit 520 performs processing for image stabilization, posture control or GPS autonomous navigation based on the angular velocity information. The memory 530 (ROM, RAM or the like) stores a control program or a variety of data, or functions as a work area or a data storage area. The operating unit 540 is provided to allow a user to operate the electronic apparatus 500, and the display unit 550 displays a variety of information to the user.

The gyro sensor 510 (sensor) includes a vibrator 10, and a detection device 20. The vibrator 10 (physical quantity transducer in a broad sense) shown in FIG. 1 is a tuning fork type piezoelectric vibrator formed of a thin plate of a piezoelectric material such as a quartz crystal, and includes driving vibrators 11 and 12, and detecting vibrators 16 and 17. Drive terminals 2 and 4 are provided in the driving vibrators 11 and 12, and detecting terminals 6 and 8 are provided in the detecting vibrators 16 and 17.

The detection device 20 includes a drive circuit 30, a detection circuit 60, and a digital signal processing unit 110. The drive circuit 30 receives a feedback signal from the vibrator 10 to drive the vibrator 10. For example, the drive circuit 30 outputs a drive signal (drive voltage) to drive the vibrator 10. Further, the drive circuit 30 receives a feedback signal from the vibrator 10 to excite the vibrator 10.

The detection circuit 60 performs detection based on the signal from the vibrator 10, and outputs detection data. For example, the detection circuit 60 receives a detection signal (detection current or electrical charges) from the vibrator 10 driven by the drive signal. Then, the detection circuit 60 detects (extracts) a desired signal (Coriolis force signal) based on the physical quantity applied to the vibrator 10 from the detection signal.

Specifically, an AC drive signal (drive voltage) from the drive circuit 30 is applied to the drive terminal 2 of the driving vibrator 11. Then, the driving vibrator 11 starts vibration by an inverse piezoelectric effect, and the driving vibrator 12 also starts vibration due to tuning fork vibration. Here, a current (electric charges) generated by a piezoelectric effect of the driving vibrator 12 is fed back to the drive circuit 30 as a feedback signal from the drive terminal 4. Thus, an oscillation loop including the vibrator 10 is formed.

If the driving vibrators 11 and 12 vibrate, the detecting vibrators 16 and 17 vibrate at a vibration velocity v in a direction shown in FIG. 1. Then, currents (electric charges) generated by a piezoelectric effect of the detecting vibrators 16 and 17 are output from the detection terminals 6 and 8 as detection signals (first and second detection signals). Then, the detection circuit 60 receives the detection signal from the vibrator 10 to detect a desired signal (desired wave) that is a signal based on a Coriolis force. That is, if the vibrator 10 (gyro sensor) rotates around a detection axis 19, the Coriolis force Fc is generated in a direction orthogonal to the vibration direction of the vibration velocity v. For example, when the angular velocity when the vibrator 10 rotates around the detection axis 19 is represented as $\omega$, the mass of the vibrator is represented as m, and the vibration velocity of the vibrator is represented as v, the Coriolis force is expressed as $Fc = 2m \cdot v \cdot \omega$. Accordingly, the detection circuit 60 can detect the desired signal that is a signal based on the Coriolis force, to thereby calculate the rotational angular velocity $\omega$ of the gyro sensor. By using the calculated angular velocity $\omega$, the processing unit 520 can perform a variety of processing for image stabilization, posture control, GPS autonomous navigation or the like.

The digital signal processing unit 110 performs digital filtering for the detection data from the detection circuit 60. In this case, in the present embodiment, the digital signal processing unit 110 performs, for the detection data, band elimination filtering for attenuating a component of a detuning frequency $\Delta f = |fd - fs|$ corresponding to a difference between a drive side resonance frequency fd and a detection side resonance frequency fs. By attenuating the component of the detuning frequency by the band elimination filtering in this way, an unnecessary signal of the detuning frequency is removed.

FIG. 1 shows an example in which the vibrator 10 is a tuning fork type, but the vibrator 10 of the present embodiment is not limited to such a structure. For example, a T-shaped type, a double T-shaped type or the like may be used. Further, the piezoelectric material of the vibrator 10 may be formed of a material other than the quartz crystal.

2. Detection Device

FIG. 2 shows a detailed configuration example of the detection device 20 of the present embodiment.

The drive circuit 30 includes an amplifier circuit 32 to which a feedback signal DI from the vibrator 10 is input, a gain control circuit 40 that performs an automatic gain control, and a drive signal output circuit 50 that outputs a drive signal DQ to the vibrator 10. Further, the drive circuit 30 includes a synchronization signal output circuit 52 that outputs a synchronization signal SYC to the detection circuit 60. The drive circuit 30 is not limited to the configuration shown in FIG. 2, and various modifications such as an omission of a part of the components or an addition of other components may be made.

The amplifier circuit 32 (I/V converting circuit) amplifies the feedback signal DI from the vibrator 10. For example, the amplifier circuit 32 converts the current signal DI from the vibrator 10 into a voltage signal DV, and outputs the result. The amplifier circuit 32 may be realized by a capacitor, a resistor, an operational amplifier, and the like.

The drive signal output circuit 50 outputs the drive signal DQ based on the signal DV subjected to the amplification in the amplifier circuit 32. For example, the drive signal output circuit 50 outputs a drive signal of a square wave (or a sine wave). The drive signal output circuit 50 may be realized by a comparator, and the like.

The gain control circuit 40 (AGC) outputs a control signal DS to the drive signal output circuit 50 to control the amplitude of the drive signal DQ. Specifically, the gain control circuit 40 monitors the signal DV to control the gain of the oscillation loop. For example, in the drive circuit 30, it is necessary to constantly maintain the amplitude of the drive voltage to be supplied to the vibrator 10 (driving vibrator), in order to constantly maintain the sensitivity of the gyro sensor. For this reason, the gain control circuit 40 for automatically adjusting the gain is provided in the oscillation loop of a drive vibration system. The gain control circuit 40 variably and automatically adjusts the gain so that the amplitude (vibration velocity v of the vibrator) of the feedback signal DI from the vibrator 10 becomes constant.

The synchronization signal output circuit 52 receives the output signal DV subjected to the amplification in the amplifier circuit 32, and outputs the synchronization signal SYC (reference signal) to the detection circuit 60. The synchronization signal output circuit 52 may be realized by a comparator that generates the synchronization signal SYC of a square wave by performing binarization of the signal DV of a sine wave (AC), a phase adjustment circuit (phase shifter) that performs phase adjustment of the synchronization signal SYC, and the like.

The detection circuit 60 includes an amplifier circuit 61, a synchronization detection circuit 81, and an A/D converting circuit 100. The amplifier circuit 61 receives first and second detection signals IQ1 and IQ2 from the vibrator 10, and performs signal amplification or electric charge-voltage conversion. The synchronization detection circuit 81 performs synchronization detection based on the synchronization signal SYC from the drive circuit 30. The A/D converting circuit 100 performs A/D conversion of the signal subjected to the synchronization detection.

The detection device 20 includes the digital signal processing unit 110 and a storage unit 116. The digital signal processing unit 110 performs a variety of digital signal processing for the detection data from the detection circuit 60. The digital signal processing unit 110 may be realized by a logic circuit (gate array and the like), a processor, and the like.

The digital signal processing unit 110 performs the filtering using a band limit low pass filter of which a cutoff frequency is variable. The low pass filtering is performed by a band limit low pass filter (LPF) unit 112.

In an application where a gyro sensor is used, it is preferable that the frequency band width of the desired signal can be limited. For example, by limiting the frequency band width of the desired signal to a band width necessary for the application, the S/N ratio can be enhanced. Further, the band width varies according to an application such as a car navigation system or a digital still camera.

Thus, the band limit LPF unit 112 performs band limit low pass filtering for limiting the frequency band width of the desired signal to the band width according to the application. A modification in which a component of the band limit LPF unit 112 is omitted may be made.

Further, the digital signal processing unit 110 performs the band elimination filtering for attenuating the component of the detuning frequency $\Delta f=|fd-fs|$ corresponding to the difference between the drive side resonance frequency fd and the detection side resonance frequency fs for the detection data. The band elimination filtering is performed by the band elimination filter unit (BEF) 114.

Here, when a variable range of a cutoff frequency of the band limit low pass filter in the band limit LPF unit 112 is represented as fca to fcb and the center frequency of the band elimination is represented as fm, the relationship of fca<fm<fcb is satisfied.

That is, as described above, the band limit LPF unit 112 performs the band limit low pass filtering according to the application. Further, since the band width limit varies according to the application, the cutoff frequency of the band limit low pass filter becomes variable. Here, the variable range of the cutoff frequency is set to fca to fcb. Further, the center frequency fm of the band elimination corresponding to the detuning frequency is in this variable range, and thus, the relationship of fca<fm<fcb is satisfied.

The digital filter of the digital signal processing unit 110 may be realized by an IIR filter or the like, for example. The IIR filter includes a register (delay element $Z^{-1}$), a multiplier that performs multiplication using a filter coefficient, or an adder that performs addition or the like for an output of the multiplier. Further, the digital filtering may be realized by setting the filter coefficient to a predetermined coefficient. For example, the setting of the variable range fca to fcb of the cutoff frequency of the band limit LPF unit 112 may be realized by variably setting the filter coefficient. Various modifications may be made. For example, an FIR filter instead of the IIR filter may be used as the digital filter.

The storage unit 116 stores a variety of information. For example, the storage unit 116 stores information on a filter coefficient for setting a frequency characteristic (center frequency, half-power frequency, gain, group delay, or the like) of the band elimination filter or the like. Specifically, the storage unit 116 stores information on plural filter coefficients respectively corresponding to plural vibrators (plural gyro sensors). For example, the storage unit 116 stores information on a first filter coefficient for a first vibrator (first gyro sensor), and stores information on a second filter coefficient for a second vibrator (second gyro sensor). The storage unit 116 may be realized by a nonvolatile memory such as an erasable programmable ROM (EPROM) or one time programmable ROM (OTP), a volatile memory such as an SRAM or a DRAM, a storage circuit such as a flip flop, or the like.

3. Removal of Unnecessary Signal of Detuning Frequency Using BEF

An unnecessary signal due to the detuning frequency $\Delta f=|fd-fs|$ among the unnecessary signals is generated when a signal of the detection side resonance frequency fs is mixed with a sensor signal and the sensor signal is synchronization-detected by the synchronization detection circuit 81. For example, in order to enhance a response characteristic of the gyro sensor, the detecting vibrator may vibrate in an idling manner at a natural resonance frequency fs with a minute amplitude. Alternatively, the detecting vibrator may vibrate at the natural resonance frequency fs when external vibration from the outside of the gyro sensor is applied to the vibrator. In this way, if the detecting vibrator vibrates at the frequency fs, the signal of the frequency fs may be mixed with the signal input to the synchronization detection circuit 81. Further, since the synchronization detection circuit 81 performs the synchronization detection based on the synchronization signal SYC of the frequency fd, the unnecessary signal of the detuning frequency Δf=|fd−fs| corresponding to the difference of the frequencies fd and fs is generated. If such an unnecessary signal is generated, for example, when the angular velocity data detected by the gyro sensor is integrated to calculate angle data or the like, it is difficult to obtain accurate angle data or the like.

A method for removing such an unnecessary signal of the detuning frequency using the low pass filter is considered.

However, the detuning frequency Δf=|fd−fs| is sufficiently small, compared with fd and fs. Accordingly, in order to remove the unnecessary signal of the detuning frequency while securing a signal band, a steep attenuation characteristic is necessary, and thus, a high-order low pass filter should be employed. Such a high-order low pass filter increases a signal delay amount in the signal band, or increases the size of the circuit, which increases the cost.

On the other hand, if a low-order low pass filter is employed in order to reduce the signal delay amount in the signal band, it is necessary to lower the cutoff frequency in order to sufficiently attenuate the component of the detuning frequency. However, if the cutoff frequency is lowered, the signal band should be narrowed, which impairs the convenience of the application.

Further, in such a related art technique, a low pass filter of an analog signal is applied to an analog signal after synchronization detection, or a band pass filter of an analog circuit is applied to an analog signal before synchronization detection.

However, as described later, a characteristic (center frequency or variance) of the detuning frequency is different for each element of the vibrator (gyro sensor). Further, in the low pass filter or the band pass filter of the analog circuit, it is difficult to variably change the frequency characteristic of the filter using a simple method. Accordingly, when the characteristic of the detuning frequency is different for each vibrator, it is difficult to handle the problem.

In this regard, in the present embodiment, since the component of the detuning frequency is attenuated by the band elimination filtering (notch filtering) in the BEF unit 114, the above problems can be solved.

That is, according to the method of the present embodiment in which the detuning frequency component is attenuated using the band elimination filter, for example, it is possible to configure a filter of a low-order, for example, about a second order. Accordingly, for example, since the signal delay amount (group delay) in the signal band can be reduced, a negative influence on the signal band can be reduced. Further, by using the low-order filter configuration, the size of the circuit can be reduced, to thereby achieve reduction of the cost or the like.

In addition, the BEF unit 114 is provided in the digital signal processing unit 110, and performs the band elimination filtering that is the digital filtering for the digital detection data. Accordingly, it is possible to simply solve the problem that the characteristic of the detuning frequency is different for each vibrator. That is, in the case of the digital filtering, the frequency characteristic (center frequency, half-power frequency or the like) of the band elimination filter can be simply changed by simply changing the filter coefficient. Thus, it is possible to solve the problem that the characteristic of the detuning frequency is different for each vibrator by storing the filter coefficient for each vibrator in the storage unit 116, for example.

Figure 3B:
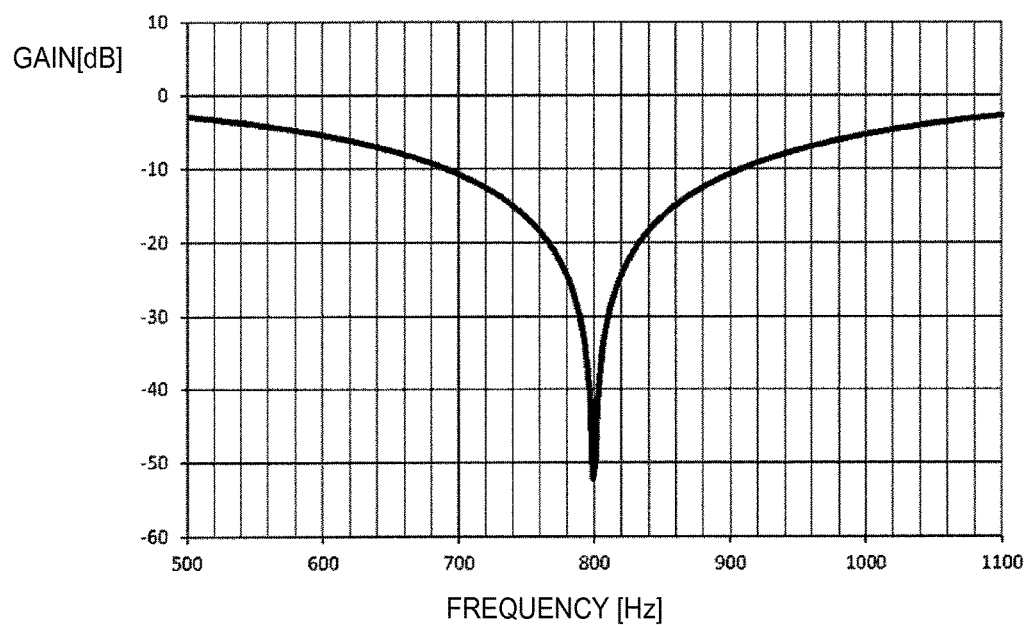

FIG. 3A is a diagram illustrating an example of a gain characteristic of the band elimination filter of the BEF unit 114, and FIG. 3B is an enlarged view of a half-power width region of the center frequency. In the band elimination filter, the center frequency (fm) is about 800 Hz, for example, a half-power frequency on a low frequency side is about 505 Hz, for example, and a half-power frequency on a high frequency side is about 1085 Hz, for example. The sampling frequency of the digital filtering is about 15 kHz. Further, the half-power frequency is a frequency of which a signal component is a half amplitude (−6 dB).

As shown in FIGS. 3A and 3B, according to the band elimination filter, at the center frequency of 800 Hz, for example, a signal component of about −50 dB can be attenuated. Accordingly, when the detuning frequency Δf=|fd−fs| is around 800 Hz, for example, the component of the detuning frequency can be sufficiently attenuated.

Figure 4:
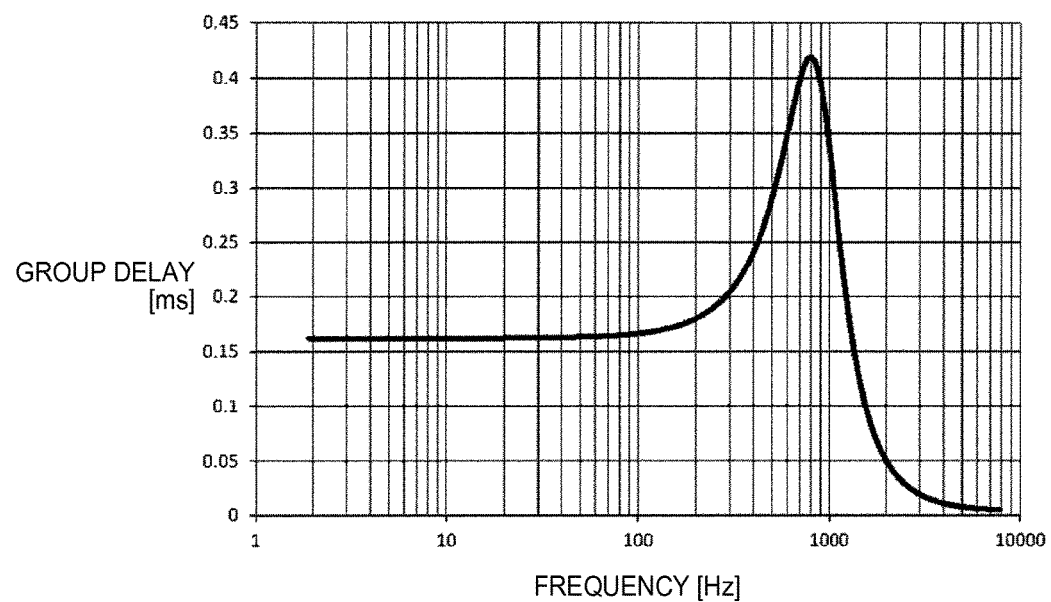
FIG. 4 is a diagram illustrating a group delay characteristic of the band elimination filter.

FIG. 4 is a diagram illustrating an example of a group delay characteristic of the band elimination filter of the BEF unit 114. As shown in FIG. 4, according to the band elimination filter, a group delay in a DC band is about 0.16 ms, a group delay in a band of 400 Hz is about 0.24 ms, and a group delay in a band of 500 Hz is about 0.29 ms. Accordingly, the signal delay amount in the signal band of the desired signal can be sufficiently reduced.

As illustrated in FIG. 2, the digital signal processing unit 110 includes the band limit LPF unit 112 and the BEF unit 114. The band limit LPF unit 112 is a low pass filter for performing a band limit based on an application. That is, as described above, as the band limit LPF unit 112 limits the frequency bandwidth of the desired signal to a band width necessary for an application (posture control of a digital still camera, a car navigation system, a vehicle or the like), the S/N ratio can be enhanced.

Figure 5A:
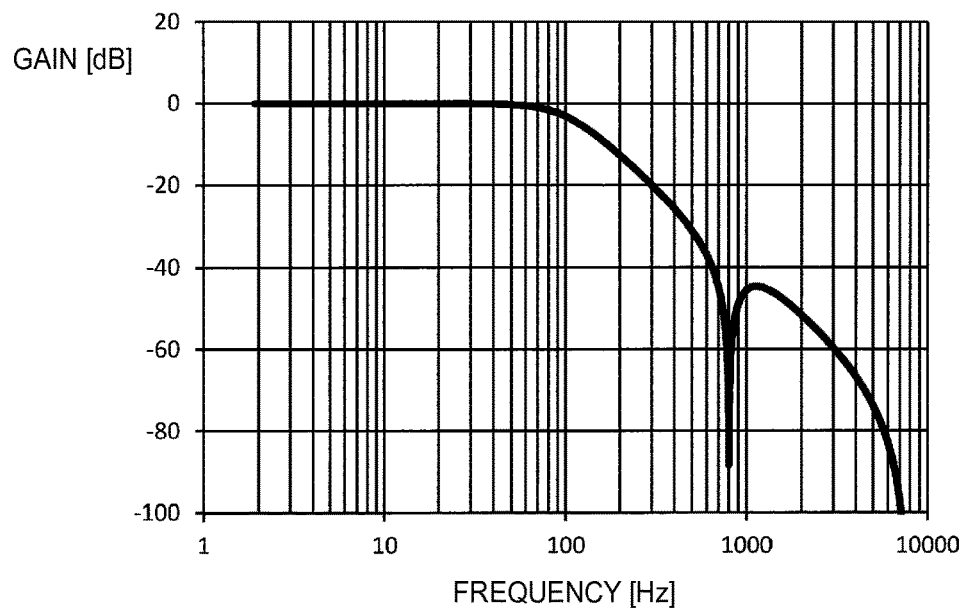
FIGS. 5A and 5B are diagrams illustrating a gain characteristic and a group delay characteristic when a band limit low pass filter and the band elimination filter are combined.
Figure 5B:
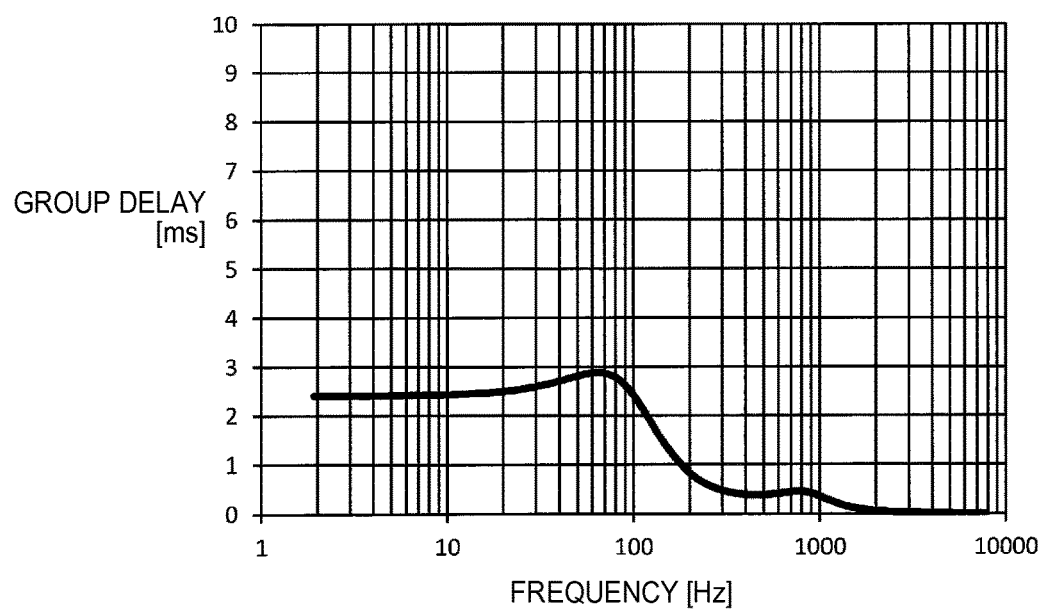

FIGS. 5A and 5B are diagrams illustrating a gain characteristic and a group delay characteristic when a band limit low pass filter and a band elimination filter are combined.

As shown in FIG. 5A, by the combination of the band limit low pass filter and the band elimination filter, in the center frequency of the band elimination filter, for example, a signal component of about −90 dB can be attenuated. Accordingly, the component of the detuning frequency can be sufficiently attenuated.

Further, as shown in FIG. 5B, the group delay in the signal band of the desired signal can be suppressed to about 2.5 ms to about 3 ms.

Figure 6A:
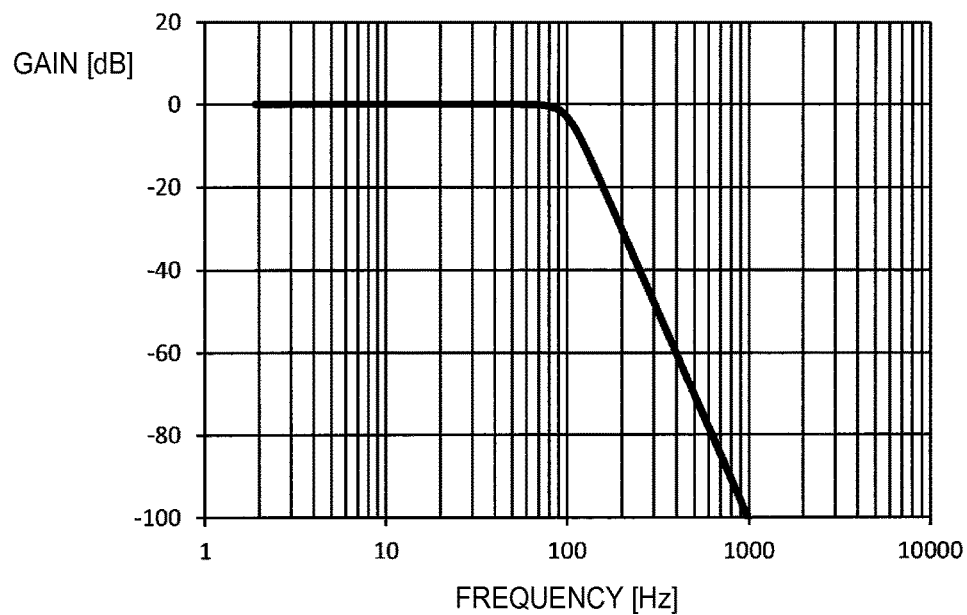
FIGS. 6A and 6B are diagrams illustrating a gain characteristic and a group delay characteristic of a fifth order low pass filter.
Figure 6B:
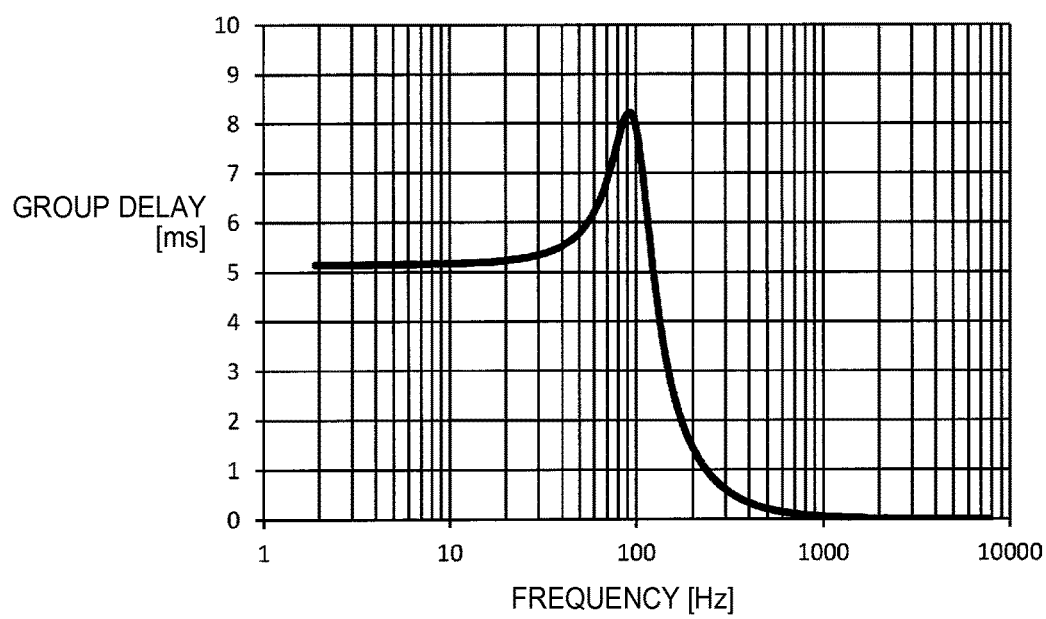

On the other hand, FIGS. 6A and 6B are diagrams illustrating examples of a method for removing an unnecessary signal of a detuning frequency by a high-order low pass filter, as a comparative example of the present embodiment. Specifically, FIGS. 6A and 6B show examples of a gain characteristic and a group delay characteristic when a fifth order low pass filter is used.

As shown in FIG. 6A, in order to obtain the same attenuation amount as in FIG. 5A at the detuning frequency of 800 Hz, it is necessary to provide a low pass filter of a high-order, for example, about a fifth order. Then, as shown in FIG. 5B, if such a high-order low pass filter is used, the group delay becomes about 5 ms, for example. Accordingly, compared with FIG. 5B, the group delay increases, and the signal delay amount in the signal band increases. Such an increase in the signal delay amount may cause trouble to a process of a subsequent stage application (application executed by a micro computer or the like) that uses detection data such as angular velocity data. Further, in the high-order low pass filter such as a fifth order low pass filter, the size of the circuit increases.

In this regard, according to the method of the present embodiment using the band elimination filter, it is possible to attenuate the detuning frequency component at a sufficient attenuation rate while suppressing the increase of the signal delay amount in the signal band.

Figures 7, 8:
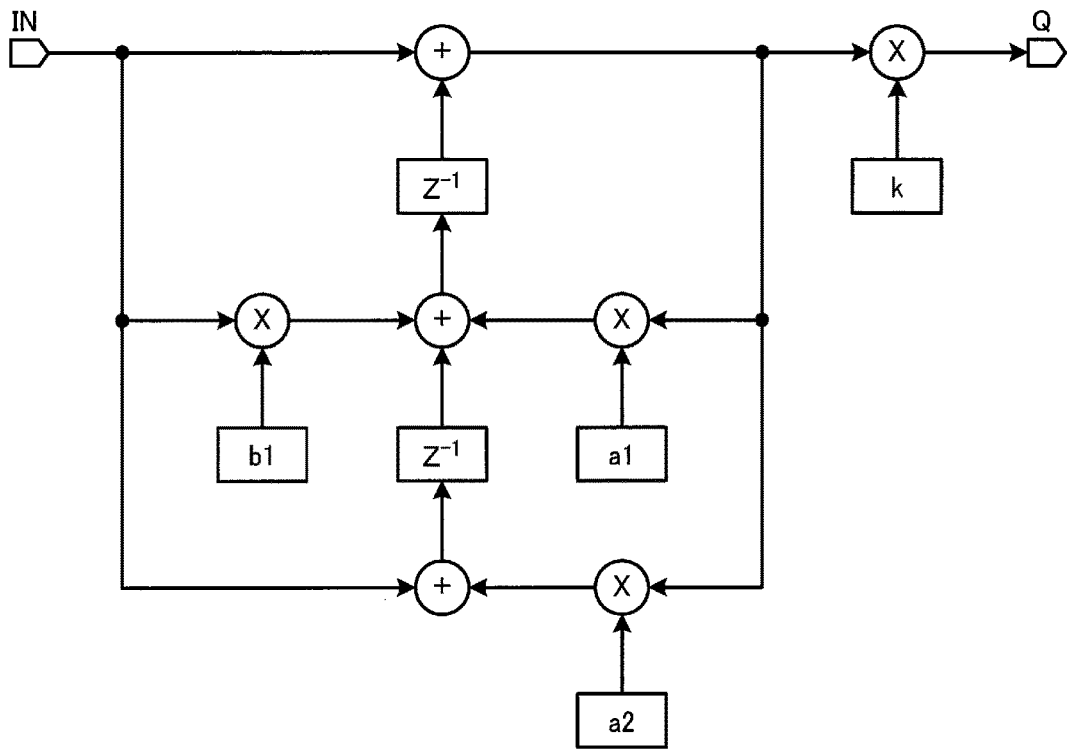
FIG. 7 is a diagram illustrating a configuration example of the band elimination filter.
FIG. 8 is an explanatory diagram illustrating a method for setting a filter coefficient based on a vibrator.

FIG. 7 is a diagram illustrating a configuration example of the band elimination filter (hereinafter, referred to as BEF) of the BEF unit 114. In FIG. 7, the BEF is configured by a secondary IIR filter, and includes plural registers (delay element $Z^{-1}$), plural adders, and plural multipliers. A transfer function of the BEF shown in FIG. 7 may be expressed as follows.

$$H(z) = k \frac{1 - 2\cos\omega_0 z^{-1} + z^{-2}}{1 - 2r\cos\omega_0 z^{-1} + r^2 z^{-2}} \quad \text{Expression 1}$$
$$= k \frac{1 + b_1 z^{-1} + z^{-2}}{1 - a_1 z^{-1} - a_2 z^{-2}}$$
$$\omega_0 = 2\pi \frac{fm}{fsp}$$

In the above expression, a1, a2, b1, and k are filter coefficients of the BEF shown in FIG. 7. Further, fm represents the center frequency of the BEF, fsp represents a sampling frequency of a digital filter of the BEF, and r represents a constant that determines a half-power frequency.

4. Variable Setting of Filter Coefficient

The center frequency or variance of the detuning frequency is different for each vibrator (gyro sensor) element. For example, in FIG. 8, the center frequency of the detuning frequency of vibrator A is 800 Hz, and variance thereof is ±300 Hz. The center frequency of the detuning frequency of vibrator B is 900 Hz, and variance thereof is ±200 Hz. The center frequency of the detuning frequency of vibrator C is 950 Hz, and variance thereof is ±250 Hz.

If the characteristic (center frequency or variance) of the detuning frequency is different for each vibrator in this way, in the frequency characteristic of the BEF as shown in FIGS. 3A and 3B, for example, it is difficult to sufficiently attenuate the component of the detuning frequency.

For example, as shown in FIG. 6A, in the method for removing the unnecessary signal of the detuning frequency using the high-order low pass filter (hereinafter, referred to as LPF), the difference of the detuning frequency for each vibrator does not cause a big problem. However, in the BEF, since the frequency range where the signal is attenuated (frequency range around the center frequency) is relatively narrow, the difference of the detuning frequency for each vibrator causes a problem.

Thus, in the present embodiment, as shown in FIG. 8, the filter coefficient can be individually set for each vibrator of the plural vibrators. Specifically, the storage unit 116 shown in FIG. 2 stores information on plural filter coefficients so that each filter coefficient corresponds to each vibrator of the plural vibrators. For example, in FIG. 8, information on a filter coefficient CFA corresponding to the vibrator A is stored, information on a filter coefficient CFB corresponding to the vibrator B is stored, and information on a filter coefficient CFC corresponding to the vibrator C is stored.

Here, the information on the filter coefficients is information on the filter coefficients a1, a2, b1, and k shown in FIG. 7, for example, which may directly indicate the filter coefficients or may be information for specifying the filter coefficients.

Figure 9A:
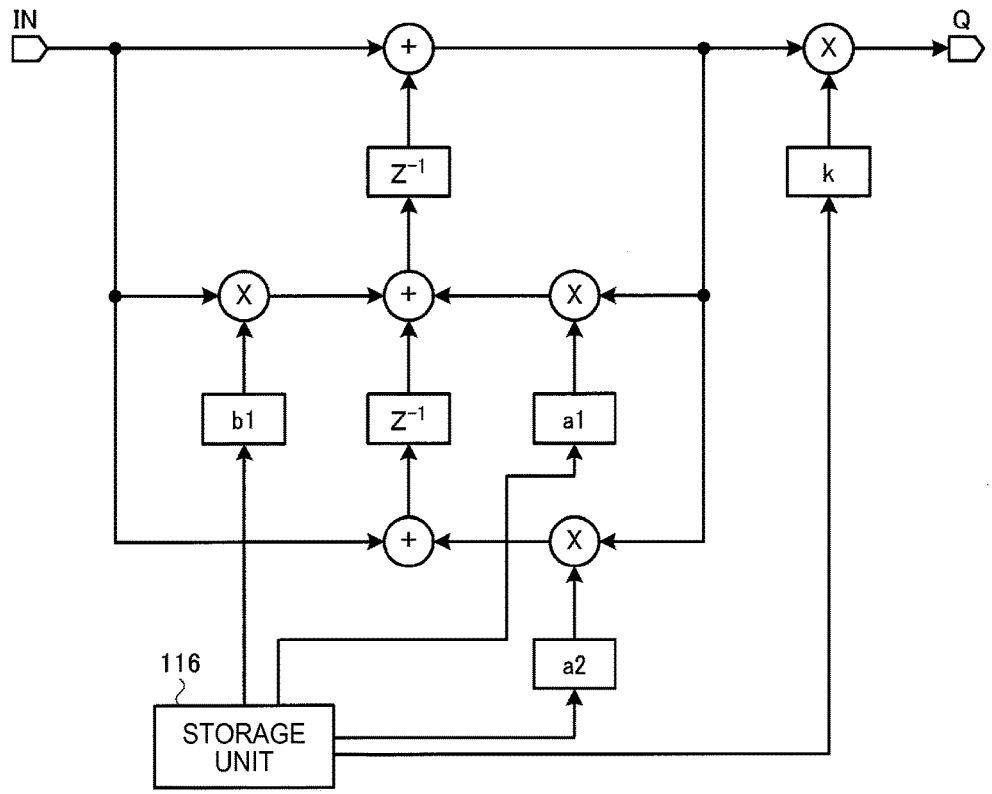
FIGS. 9A and 9B are diagrams illustrating a method for setting a filter coefficient based on the vibrator.

Further, in FIG. 9A, for example, when the detection device 20 (gyro sensor) is manufactured, the information on the filter coefficients a1, a2, b1, and k is stored in the storage unit 116. For example, the information on the filter coefficients is stored in a non-volatile memory or the like that forms the storage unit 116. Then, when the detection device 20 is operated, the information on the filter coefficients stored in the storage unit 116 is read. In this case, for example, when power is supplied, the information on the filter coefficients may be transmitted from the non-volatile memory to a register, and when digital filtering is performed, the information on the filter coefficients may be read from the register. In addition, the detection device 20 executes arithmetic processing (multiplication or addition) corresponding to the above-described transfer function of the BEF using the information on the read filter coefficients, to realize the frequency characteristic of the BEF shown in FIGS. 3A and 3B.

According to the method in FIG. 9A, even though the detuning frequencies are variously different in the respective vibrators, for example, by changing the storage content of the storage unit 116 (register) from an external device, it is possible to simply handle the situation.

Figure 9B:
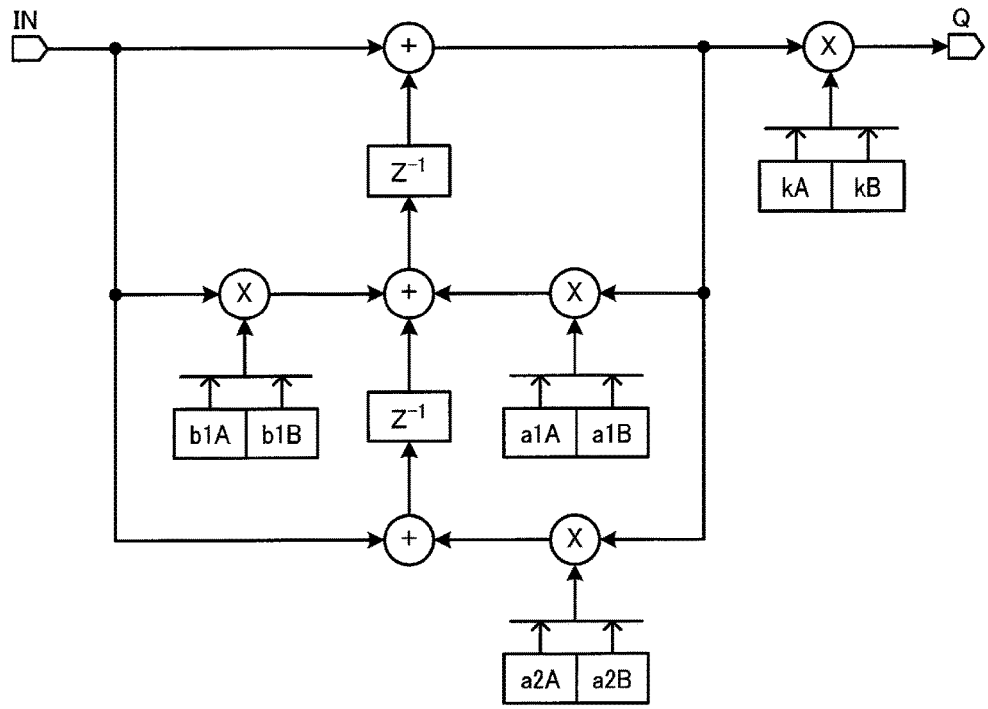

As shown in FIG. 9B, the filter coefficient corresponding to each vibrator may be selected from fixed filter coefficients. For example, in the case of the vibrator A, filter coefficients a1A, a2A, b1A, and kA are selected, and the center frequency of the BEF is set to a frequency corresponding to the detuning frequency of the vibrator A. In contrast, in the case of the vibrator B, filter coefficients a1B, a2B, b1B, and kB are selected, and the center frequency of the BEF is set to a frequency corresponding to the detuning frequency of the vibrator B. According to this method, the circuit configuration and processing can be simplified.

5. Band Limit LPF and BEF

Figure 10:
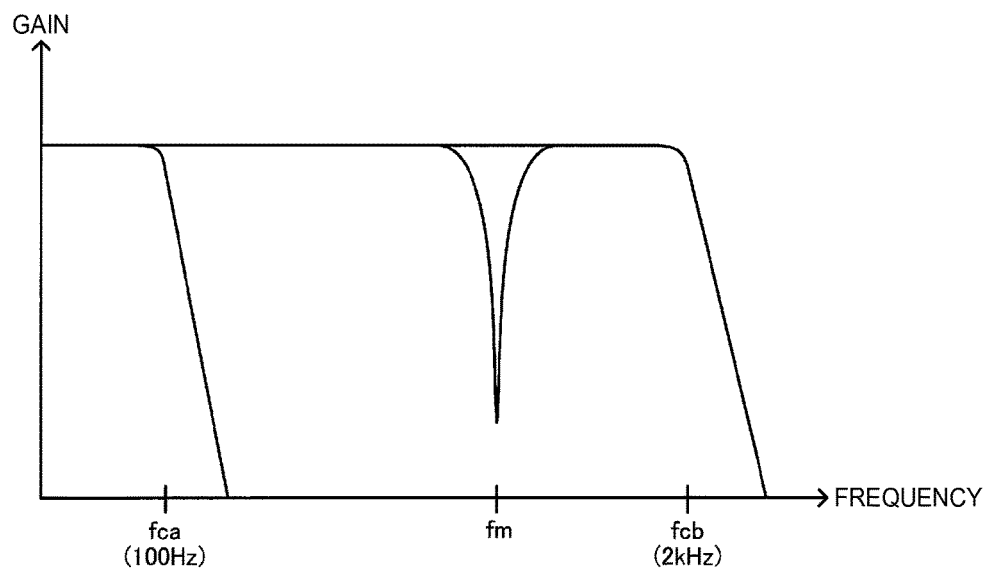
FIG. 10 is a diagram illustrating the relationship between a variable range of a cutoff frequency of the band limit low pass filter and a center frequency of the band elimination filter.

FIG. 10 is a diagram schematically illustrating the frequency relationship between the band limit LPF and the BEF for removal of the detuning frequency.

In FIG. 10, the variable range of the cutoff frequency of the band limit LPF is represented as fca to fcb, and the center frequency of the BEF for removal of the detuning frequency is represented as fm. In this case, in the present embodiment, the relationship of fca<fm<fcb is satisfied.

For example, in a first application in which the S/N ratio is relatively important compared with the width of the band width, the cutoff frequency of the band limit LPF is set to a low frequency on the side of fca. Thus, the S/N ratio can be enhanced while the band width of the desired signal is narrowed.

On the other hand, in a second application in which the width of the band width is relatively important compared with the S/N ratio, the cutoff frequency of the band limit LPF is set to a high frequency on the side of fcb. Thus, the band width of the desired signal can be enlarged while the S/N ratio becomes low.

In order to handle the various applications, in FIG. 10, the cutoff frequency of the band limit LPF may be variably set in the range of fca to fcb.

On the other hand, if the component of the unnecessary signal of the detuning frequency is present in the bandwidth set in this way, when a subsequent stage application performs processing using the detection data of the desired signal, for example, an error may occur in the processing result. For example, when angle data is calculated by performing integration of the angular velocity data that is the detection data, an error occurs in the angle data.

For example, in FIG. 10, in order to enlarge the band width, it is assumed that the cutoff frequency is set to fcb=2 kHz on the high band side. Then, since the detuning frequency (=800 kHz) is in the band width set by fcb, when the processing is performed based on the detection data of the desired signal, an error occurs in the processing result.

In this regard, in the present embodiment, even when the component of the unnecessary signal of the detuning frequency is present in the set band width, the component of the unnecessary signal can be attenuated and removed by the BEF. For example, when the cutoff frequency of the band limit LPF is set to fcb=2 kHz on the high band side, and the band width is set to a wide range of DC to fcb, similarly, since the relationship of fca<fm<fcb is satisfied, the component of the unnecessary signal of the detuning frequency in the band width DC to fcb can be sufficiently attenuated by the BEF in which the center frequency is set to fm. In other words, in the present embodiment, by providing the BEF of the digital filter, it is possible to enlarge the band width set by the band limit LPF.

For example, in the method of the comparative example of FIG. 6A in which the high-order LPF is used for removal of the detuning frequency, it is difficult to set an upper limit of the band width to a high frequency, for example, fcb=2 kHz. This is because if the high-order LPF having the frequency characteristic as shown in FIG. 6A is provided for removal of the detuning frequency, the frequency component of fcb=2 kHz is also attenuated by the high-order LPF. Accordingly, in the method of the comparative example, the bandwidth of the desired signal cannot be enlarged while the unnecessary signal of the detuning frequency can be removed.

On the other hand, in the present embodiment, as shown in FIG. 10, even though the band width is enlarged so that the relationship of fca<fm<fcb is satisfied, the unnecessary signal of the detuning frequency cannot be removed by the BEF. That is, the removal of the unnecessary signal of the detuning frequency and the setting of the wide band width can be compatibly realized.

Figure 11A:
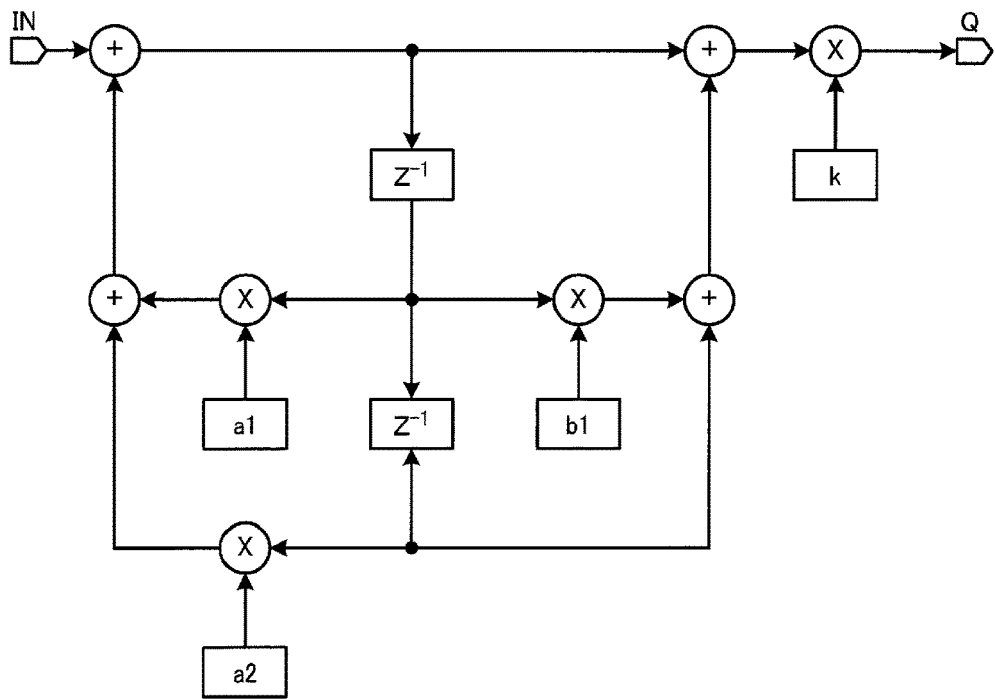
FIG. 11A is a diagram illustrating another configuration example of the band elimination filter.

The BEF is not limited to the configuration shown in FIG. 7, and various modifications may be used. For example, FIG. 11A shows a modification example of the configuration of the BEF. In FIG. 11A, a connection configuration of a register, a multiplier and an adder is different from that of FIG. 7, but a transfer function of the BEF is the same as the transfer function in the configuration of FIG. 7.

Figure 11B:
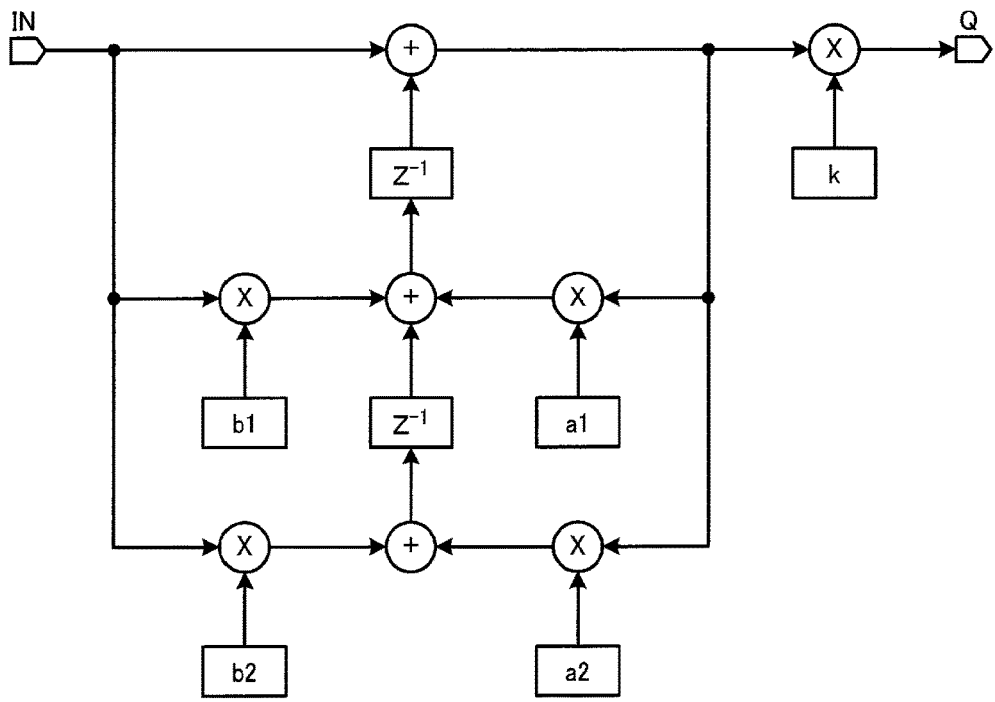
FIG. 11B is a diagram illustrating a configuration example of a secondary band limit low pass filter.

Further, FIG. 11B shows a configuration example of the band limit LPF (band limit LPF 112). The LPF shown in FIG. 11B has a configuration of a secondary IIR filter. The band limit LPF is not limited to the configuration shown in FIG. 11B, and various modifications such as a change of a connection configuration of a register, a multiplier, and an adder, or a change of the order of a filter may be made.

Figure 12:
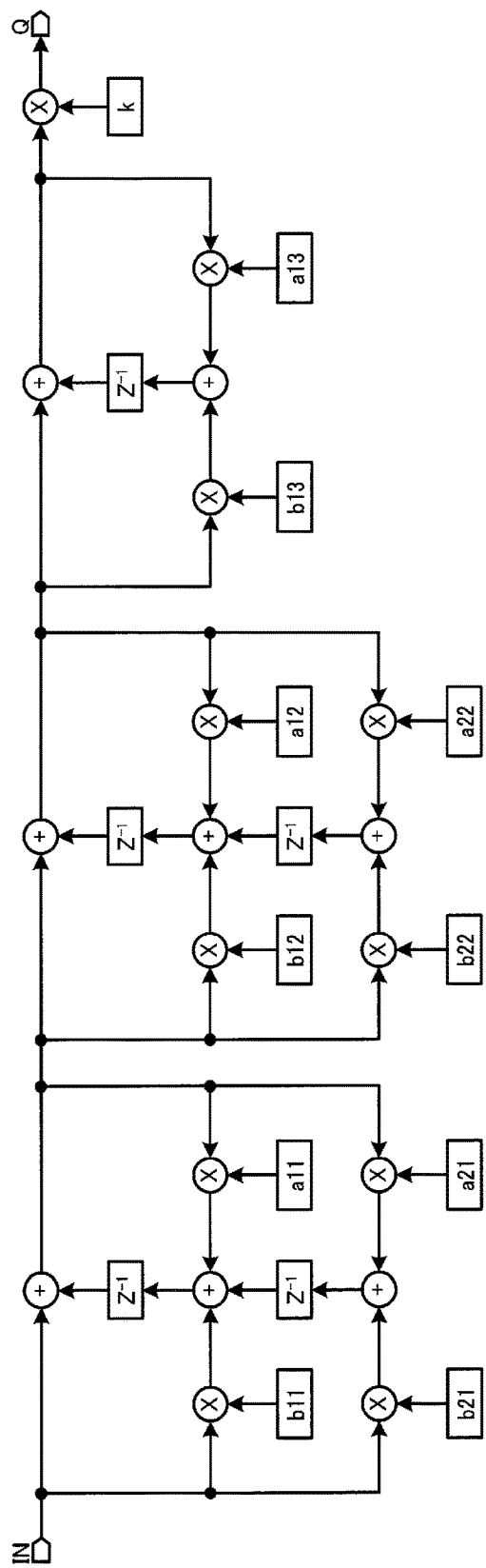
FIG. 12 is a diagram illustrating a configuration example of a fifth order low pass filter that is a comparative example.

FIG. 12 is a diagram illustrating a configuration example of a fifth order LPF that forms the comparative example described with reference to FIGS. 6A and 6B. As obvious from FIG. 12, if the high-order LPF is used for removal of the detuning frequency, the circuit size becomes large. On the other hand, if the BEF shown in FIG. 7 or the like is used for removal of the detuning frequency, it is possible to reduce the circuit size to the minimum.

6. Configuration of BEF Unit

Figure 13:
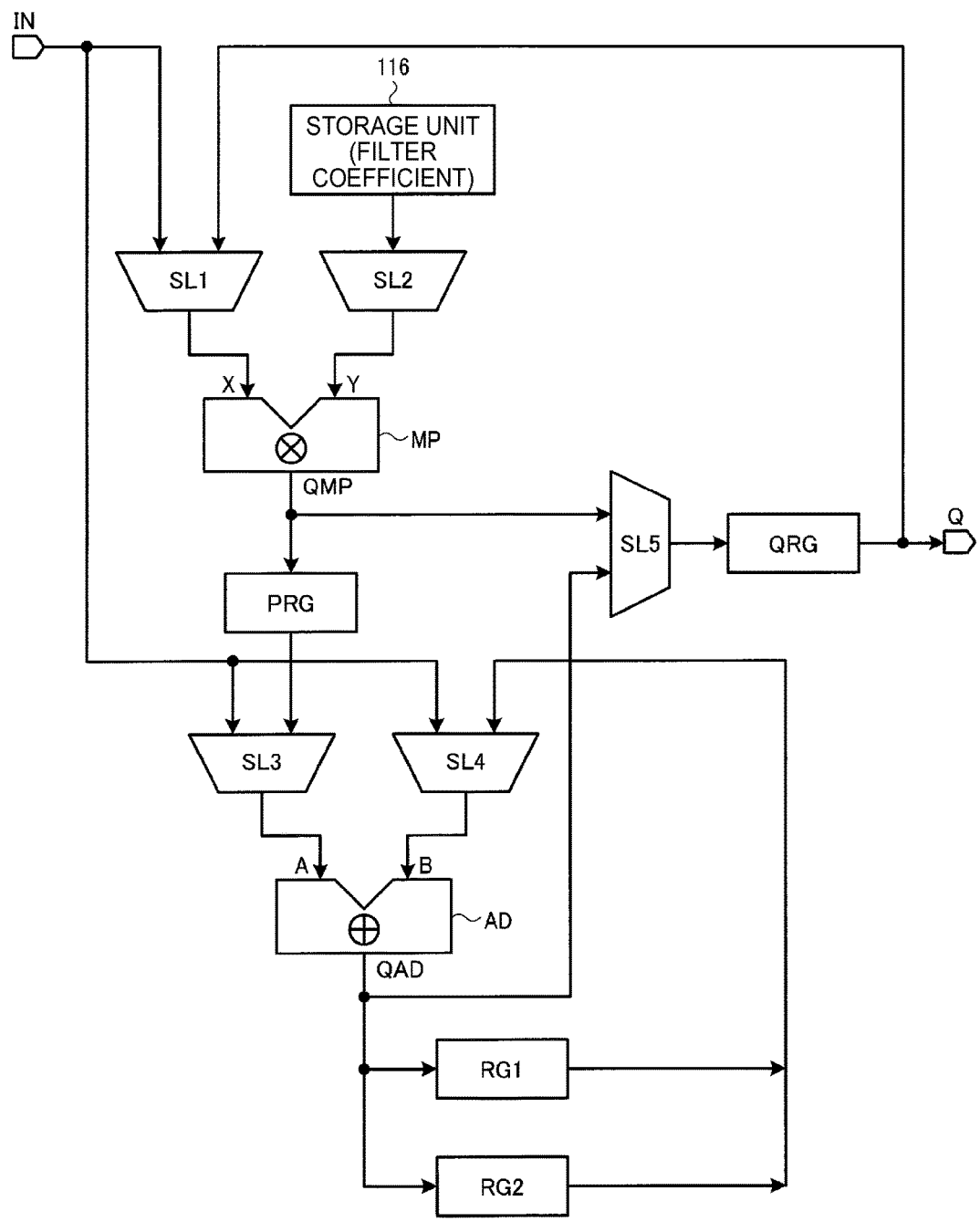
FIG. 13 is a diagram illustrating a circuit configuration example of the band elimination filter.

FIG. 13 shows a specific circuit configuration example of the BEF unit 114. As shown in FIG. 13, the BEF unit 114 includes a multiplier MP, a multiplication result register PRG, first and second addition result registers RG1 and RG2, and an adder AD. Further, the BEF unit 114 may include selectors SL1 to SL5, and an output register QRG.

The multiplier MP performs multiplication of any one of input data IN and output data Q and any one of the plural filter coefficients a1, a2, b1, and k of the band elimination filter. The plural filter coefficients of the band elimination filter are stored in the storage unit 116. The multiplication result register PRG stores multiplication result data QMP of the multiplier MP. The first and second addition result registers RG1 and RG2 store addition result data QAD of the adder AD. The adder AD performs addition of any one of the input data IN and the value of the multiplication result register PRG, and any one of the input data IN, the value of the first register RG1, and the value of the second register RG2, and outputs the addition result data QAD to the first and second registers RG1 and RG2.

More specifically, output ends of the selectors SL1 and SL2 are connected to first and second input ends of the multiplier MP. The selector SL1 selects any one of the input data IN and the output data Q, and outputs the result to the first input end of the multiplier MP. The selector SL2 selects any one of the filter coefficients a1, a2, b1, and k stored in the storage unit 116, and outputs the result to the second input end of the multiplier MP. The multiplication result data QMP of the multiplier MP is stored in the register PRG. Further, the multiplication result data QMP is input to the selector SL5.

Output ends of the selectors SL3 and SL4 are connected to first and second input ends of the adder AD. The selector SL3 selects any one of the input data IN and the value of the register PRG, and outputs the result to the first input end of the adder AD. The selector SL4 selects any one of the input data IN, the value of the register RG1, and the value of the register RG2, and outputs the result to the second input end of the adder AD. The addition result data QAD of the adder AD is stored in the registers RG1 and RG2. Further, the addition result data QAD is input to the selector SL5. Output data of the selector SL5 is stored in a register QRG.

Figure 14:
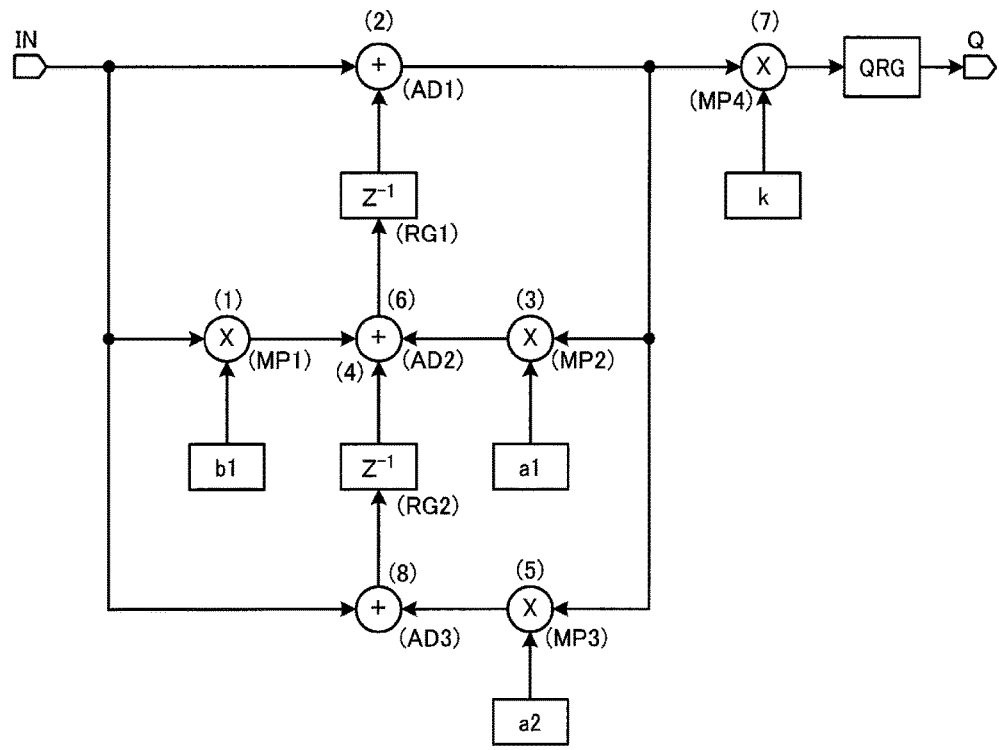
FIG. 14 is a diagram illustrating an operation of a circuit of the band elimination filter.

FIG. 14 is a diagram illustrating details of the operation of the circuit shown in FIG. 13, which corresponds to the configuration shown in FIG. 7. Multipliers MP1, MP2, MP3, and MP4 in FIG. 14 correspond to the multiplier MP in FIG. 13. Adders AD1, AD2, and AD3 in FIG. 14 correspond to the adder AD in FIG. 13. A register ($Z^{-1}$) to which an output of the adder AD2 is input corresponds to the register RG1, and a register ($Z^{-1}$) to which an output of the adder AD3 is input corresponds to the register RG2. The register QRG corresponds to a register to which an output of the multiplier MP4 is input.

The circuit shown in FIG. 13 performs processing in the order of the following sequences SQ1, SQ2, SQ3, SQ4, and SQ5. Each sequence of SQ1 to SQ5 is performed within 1 sampling rate. Each sequence is controlled by a processing clock of the digital signal processing unit 110, in which 1 sequence generally corresponds to 1 processing clock.

Sequence SQ1

In the sequence SQ1, the multiplication of the input data IN and the filter coefficient b1 is performed by the multiplier MP (MP1) shown in FIG. 13 ((1) in FIG. 14).

Simultaneously, in the sequence SQ1, the addition of the input data IN and the value of the register RG1 is performed by the adder AD (AD1) ((2) in FIG. 14).

The sequence SQ1 will be described with reference to FIG. 13. The multiplier MP performs the multiplication of the input data IN selected by the selector SL1 and the filter coefficient b1 selected by the selector SL2. Further, the adder AD performs the addition of the input data IN selected by the selector SL3 and the value of the register RG1 selected by the selector SL4.

Sequence SQ2

In the sequence SQ2, the multiplication of the value of the register QRG and the filter coefficient a1 is performed by the multiplier MP (MP2) ((3) in FIG. 14). The addition result in the sequence SQ1 ((2) in FIG. 14) is retained in the register QRG. That is, the register QRG is used as a temporary register.

Simultaneously, in the sequence SQ2, the addition of the value of the multiplication result register PRG and the value of the register RG2 is performed by the adder AD (AD2) ((4) in FIG. 14). The multiplication result ((1) in FIG. 14) in the sequence SQ1 is retained in the register PRG.

The sequence SQ2 will be described with reference to FIG. 13. The multiplier MP performs the multiplication of the value of the register QRG selected by the selector SL1 and the filter coefficient a1 selected by the selector SL2. Further, the adder AD performs the addition of the value of the register PRG selected by the selector SL3 and the value of the register RG2 selected by the selector SL4.

Sequence SQ3

In the sequence SQ3, the multiplication of the value of the register QRG and the filter coefficient a2 is performed by the multiplier MP (MP3) ((5) in FIG. 14). The addition result ((2) in FIG. 14) in the sequence SQ1 is retained in the register QRG. That is, the value in the previous sequence is retained in the register QRG as long as rewriting is not performed.

Simultaneously, in the sequence SQ3, the addition of the value of the multiplication result register PRG and the value of the register RG1 is performed by the adder AD (AD2) ((6) in FIG. 14). The multiplication result ((3) in FIG. 14) in the sequence SQ2 is retained in the register PRG. The addition result ((4) in FIG. 14) in the sequence SQ2 is retained in the register RG1. Since the register RG1 is used in the sequence SQ1, the register RG1 is used as a temporary register, regardless of rewriting.

The sequence SQ3 will be described with reference to FIG. 13, the multiplier MP performs the multiplication of the value of the register QRG selected by the selector SL1 and the filter coefficient a2 selected by the selector SL2. Further, the adder AD performs the addition of the value of the register PRG selected by the selector SL3 and the value of the register RG1 selected by the selector SL4.

Sequence SQ4

In the sequence SQ4, the multiplication of the value of the register QRG and the filter coefficient k is performed by the multiplier MP (MP4) ((7) in FIG. 14). The addition result in the sequence SQ1 ((2) in FIG. 14) is retained in the register QRG.

Simultaneously, in the sequence SQ4, the addition of the value of the multiplication result register PRG and the input data IN is performed by the adder AD (AD3) ((8) in FIG. 14). The multiplication result ((5) in FIG. 14) in the sequence SQ3 is retained in the register PRG.

The value of the register RG1 in the sequence SQ4 is determined by the addition ((6) in FIG. 14) in the sequence SQ3.

The sequence SQ4 will be described with reference to FIG. 13. The multiplier MP performs the multiplication of the value of the register QRG selected by the selector SL1 and the filter coefficient k selected by the selector SL2. Further, the adder AD performs the addition of the value of the register PRG selected by the selector SL3 and the input data IN selected by the selector SL4.

Sequence SQ5

The value of the output register QRG in the sequence SQ5 is determined by the multiplication ((7) in FIG. 14) in the sequence SQ4. The value of the register RG2 in the sequence SQ5 is determined by the addition ((8) in FIG. 14) in the sequence SQ4.

Hereinbefore, a case in which the processing of the BEF unit 114 is realized by a pipeline technique for simultaneously operating the multiplier MP and the adder AD is described, but the present embodiment is not limited thereto. For example, the processing of the BEF unit 114 may be realized by a method for using a product-sum operator without using the pipeline technique. Here, in the method for using the product-sum operator, compared with the pipeline technique for simultaneously operating the multiplier MD and the adder AD, the number of sequences increases, or the number of necessary temporary registers increases. On the other hand, in the configuration of FIG. 14, the number of sequences or the number of temporary registers can be reduced to the minimum by the pipeline operation of the multiplier MD and the adder AD, for example.

7. Interface Unit

Figure 15:
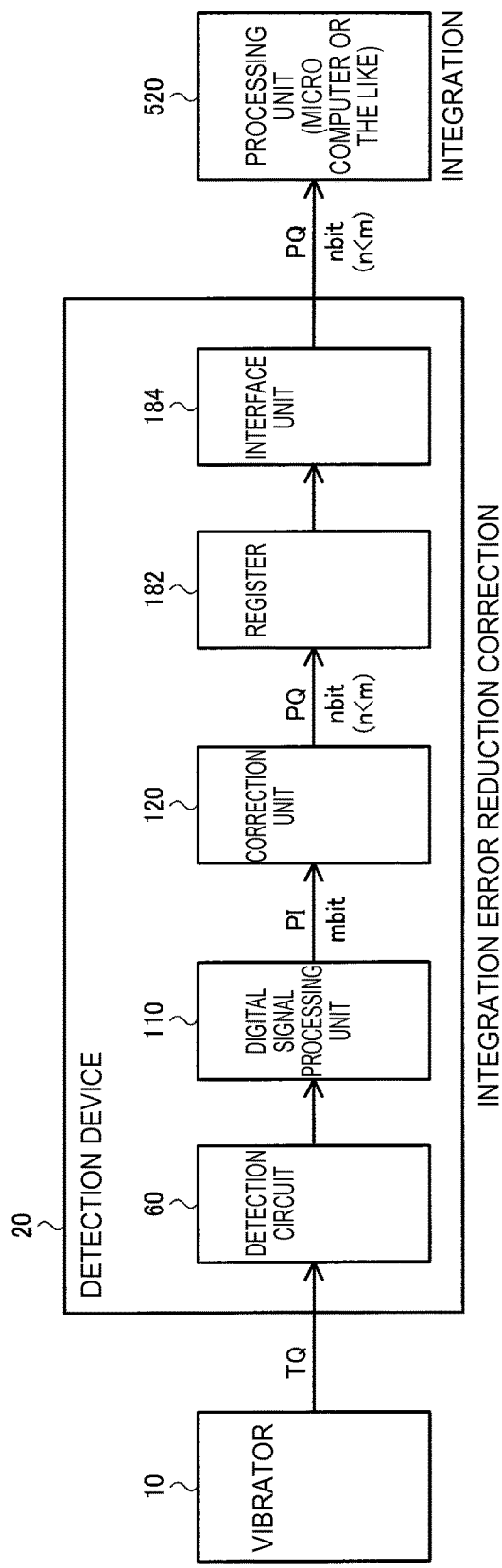
FIG. 15 is a diagram illustrating another configuration example of the detection device.

FIG. 15 is a diagram illustrating another configuration example of the detection device 20. In FIG. 15, an interface unit 184 that outputs output data PQ to the outside (processing unit 520) to be asynchronous to an output timing of detection data PI of the digital signal processing unit 110 is provided. Further, a correction unit 120 that performs correction for integration error reduction with respect to the detection data PI subjected to the digital signal processing from the digital signal processing unit 110, and a register 182 that stores the corrected data are provided.

In the detection device 20 that detects the physical quantity such as an angular velocity or an acceleration, there is a case where a processing unit 520 such as a microcomputer provided on the outside performs integration of the detected angular velocity, velocity or the like to calculate an angle, a velocity, a distance or the like.

In this case, since the detection data of the physical quantity detected by the detection device 20 is data of a limited amount of bits, if the integration of the detection data is performed, an integration error occurs. For example, when the detection data is the angular velocity data and the external processing unit 520 performs the integration of the angular velocity data, an error occurs in the angle data calculated by the integration, and thus, there is a first problem in that precise angle data cannot be obtained.

Further, there is a second problem in that the external processing unit 520 should import data in synchronization with a data output rate of the detection device 20.

In order to solve the first problem, in FIG. 15, the correction unit 120 that performs correction for reducing the error of the integration in the processing unit 520 is provided. Further, in order to solve the second problem, the interface unit 184 that outputs the output data PQ being asynchronous to the output timing of the detection data PI of the digital signal processing unit 110 is provided.

Specifically, in FIG. 15, the detection circuit 60 outputs the detection data such as angular velocity data to the digital signal processing unit 110. The detection data is data converted into digital data by an A/D converting circuit provided in the detection circuit 60. Further, the band limit LPF unit 112 and the BEF unit 114 of the digital signal processing unit 110 perform digital filtering (LPF and BEF) with respect to the detection data from the detection circuit 60, and the detection data PI subjected to the digital filtering is output to the correction unit 120.

The correction unit 120 performs correction for the detection data PI subjected to the digital filtering, and outputs the corrected data (data obtained by the correction) as the output data PQ. The output data PQ is output to the processing unit 520 through the register 182 and interface unit 184. The processing unit 520 is an external device of the detection device 20, which may be, for example, realized by a microcomputer, an ASIC or the like.

Further, in FIG. 15, the correction unit 120 receives m-bit detection data PI (digital data). That is, the correction unit 120 receives the m-bit detection data PI converted into the digital signal by the A/D converting circuit of the detection circuit 60.

Further, the correction unit 120 performs correction for reducing the integration error in the output data PQ with respect to the detection data PI (physical quantity data). Further, the correction unit 120 outputs n-bit output data PQ (digital data) (n and m are natural numbers where n<m). For example, the correction unit 120 performs correction for reducing the integration error generated when integrating the output data PQ.

That is, the external processing unit 520 may use the output data from the detection device 20 as it is, but may perform the integration of the output data to use the integration result value.

However, if the integration of the output data of the limited amount of bits is performed (angular velocity), an integration error occurs to cause an error in the integration result (angle).

In this case, if the detection device 20 outputs the data of a large amount of bits, the integration error of the integration result in the processing unit 520 can be reduced, but there is still a limit. Further, since the processing unit 520 is realized by the microcomputer or the like, there is a limit in the amount of bits of the data capable of being processed. For example, when the processing unit 520 is configured by a 16-bit microcomputer, for example, lower 8 bits of 24-bit angular velocity data is cut down, and 16-bit angular velocity data is output to the processing unit 520. Since the processing unit 520 performs the integration of the 16-bit angular velocity data, an error occurs in the angle data that is the integration result value.

Further, in the related art, the external processing unit 520 should import the angular velocity data in synchronization with the output timing (sampling rate of the A/D converting circuit of the digital filtering) of the digital signal processing unit 110 (detection circuit 60), which causes a problem. For example, since it is necessary to continuously import the angular velocity data without occurrence of data missing, the processing of the processing unit 520 is occupied in the importing process of the angular velocity data, and thus, the processing efficiency of the processing unit 520 is reduced, which causes a trouble in other processes.

Accordingly, in FIG. 15, the correction for reducing the integration error generated when the processing unit 520 integrates the output data PQ is performed by the detection device 20. For example, the digital signal processing unit 110 outputs m-bit (m=24) detection data PI. Further, the correction unit 120 performs the correction for reducing the integration error with respect to the 24-bit detection data PI. For example, the correction unit 120 performs the correction with an accuracy of 24 bits. In addition, the correction unit 120 outputs the data obtained by the correction as, for example, n-bit (n=16) output data PQ. Specifically, lower 8 bits of the 24-bit detection data PI subjected to the correction is considered as a fraction, and data obtained by cutting down the fraction or the like is output as the 16-bit output data PQ.

Further, the processing unit 520 at a subsequent stage performs integration of the 16-bit output data PQ to calculate angle data, for example. Here, the correction for reducing the integration error is performed for the 16-bit output data PQ. Accordingly, reduction of the accuracy due to the integration error of the angle data obtained by integrating the angular velocity data that is the output data PQ can be prevented. For example, the angle data with the same accuracy as in a case where the integration is performed with a resolution of 24 bits can be obtained. Further, since the output data PQ of 16 bits (n bits), instead of 24 bits (m bits), is output from the detection device 20, even though the processing unit 520 is the 16-bit microcomputer, for example, it is possible to receive the output data PQ to properly perform the processing.

For example, as a method of the comparative example of the present embodiment, a method for cutting down the fraction of the 24-bit detection data PI without performing the correction for reducing the integration error to output the 16-bit output data PQ is considered. However, in the method for simply performing only the cut-down process, when the processing unit 520 at the subsequent stage performs the integration of the output data PQ, an error due to the cut-down process or the like is accumulated, and thus, the accuracy of the integration result value obtained by the integration of the output data PQ is reduced.

In this regard, in the present embodiment, the correction unit 120 performs the correction for reducing the integration error, for example, with the accuracy of 24 bits, for the 24-bit detection data PI, and performs the cut-down process for the detection data PI subjected to the correction to output the 16-bit output data PQ. Accordingly, when the processing unit 520 at the subsequent stage performs the integration of the output data PQ, it is possible to prevent the error due to the cut-down process or the like from being accumulated, and to enhance the accuracy of the integration result value.

Further, in the present embodiment, when there is a reading request of the output data PQ, the correction unit 120 outputs the corrected data as the output data PQ, and performs the integration of the error of the output data PQ for the detection data PI to thereby retain the integration result value of the integration. That is, the processing unit 520 makes the reading request of the output data PQ to the detection device 20 without importing the output data PQ in synchronization with the output timing (output rate) of the digital signal processing unit 110. Then, the output data PQ retained in the register 182 of the detection device 20 is output to the processing unit 520 through the interface unit 184. Specifically, the interface unit 184 performs communication with the processing unit 520 using a serial interface such as a serial peripheral interface (SPI). Further, if the processing unit 520 performs access to the register 182, the output data PQ is imported in the processing unit 520 by the serial interface communication.

Here, the correction unit 120 performs the integration of the error of the output data PQ for the detection data PI, and retains the integration result value obtained by the integration in an internal register. Here, the error of the output data PQ for the detection data PI is a differential value of the detection data PI and the output data PQ, for example. The integration result value is a value obtained by integrating the error (differential value), which may directly indicate the integration value, or may be a value equivalent to the integration value (for example, value obtained by multiplying the integration value by a constant number).

Further, the correction unit 120 performs the correction in the next reading request of the output data PQ based on the integration result value (error integration value) retained in the internal register. For example, the correction unit 120 performs the correction for the next second reading request using the integration result value retained in the first reading request. Specifically, the correction unit 120 performs comparison with the integration result value retained in the internal register, and adds a result value of the comparison to the detection data PI. For example, if it is determined that the integration result value is a predetermined value or greater, a first value (for example, "1") is added to the detection data PI as the comparison result value. On the other hand, if it is determined that the integration result value is smaller than the predetermined value, a second value (for example, "0") is added to the detection data PI as the comparison result value. That is, the different values are added to the detection data PI according to whether the integration result value is the predetermined value or greater. The addition may be an addition process, or may be a process equivalent to the addition process.

In addition, the correction unit 120 cuts down a fraction of the detection data subjected to the addition, and outputs the output data PQ. That is, the data subjected to the cut-down process is output as the output data PQ.

As described above, in the present embodiment, the output data PQ is not read in synchronization with the output timing (output rate or sampling rate) of the digital signal processing unit 110, and the output data PQ is read from the detection device 20 under the condition that the reading request is made from the processing unit 520.

Figure 16:
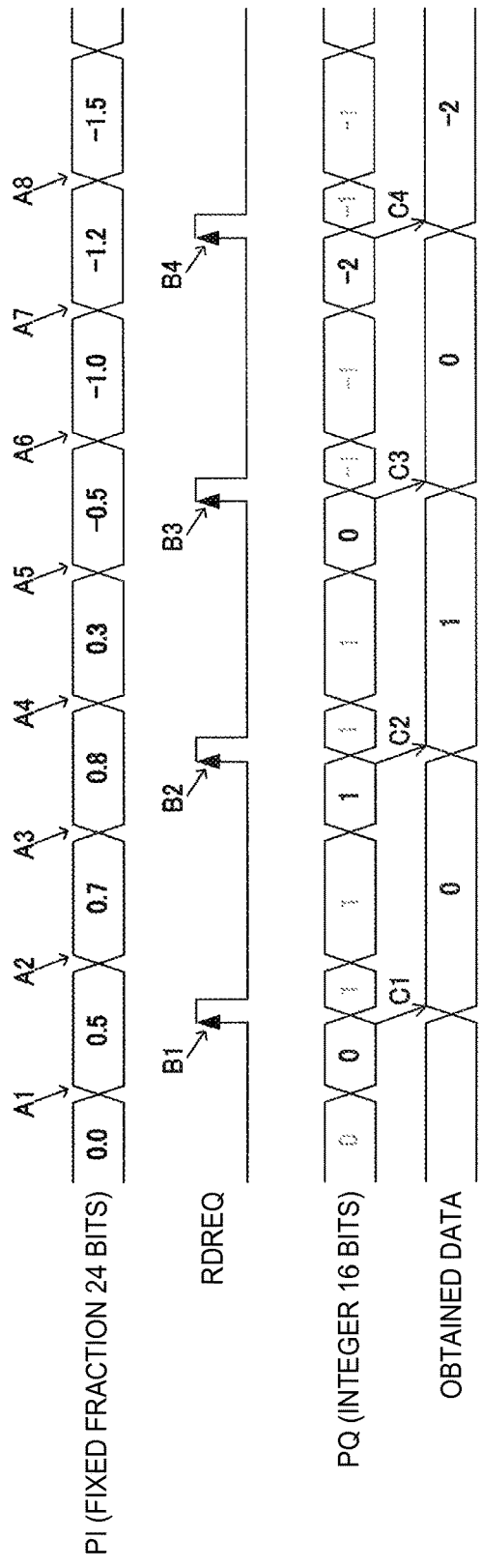
FIG. 16 is an explanatory diagram illustrating a method for re-sampling detection data to output the result to the outside.

Specifically, as shown in FIG. 16, the detection data PI is output at output timings A1, A2, A3, A4, A5, A6, A7, and A8 from the digital signal processing unit 110. The output timings A1 to A8 are timings determined by sampling timings of the digital filtering of the digital signal processing unit 110.

Further, in FIG. 16, reading requests RDREQs are output from the processing unit 520 as indicated by B1, B2, B3, and B4. The timings of the reading requests RDREQs indicated by B1, B2, B3, and B4 are asynchronous to the output timings indicated by A1 to A8 of the detection data PI from the digital signal processing unit 110. Further, by the reading requests RDREQs at B1, B2, B3, and B4, the output data PQ is output as indicated by C1, C2, C3, and C4, and is obtained by the external processing unit 520.

That is, the interface unit 184 outputs the output data PQ to the outside (C1 to C4) being asynchronous to the output timings A1 to A8 of the detection data PI of the digital signal processing unit 110. In other words, the detection data PI (A1 to A8) sampled at the sampling rate of the digital filtering of the digital signal processing unit 110 is re-sampled (C1, C2, C3, and C4), and is output to the processing unit 520 from the interface unit 184.

With this configuration, the processing unit 520 can output a reading request (B1 to B4) at a desired timing regardless of the output timings (A1 to A8) of the digital signal processing unit 110, to thereby import the output data PQ at a free timing (C1 to C4). As a result, it is possible to prevent the processing of the processing unit 520 from being occupied in the importing process of the output data PQ to reduce the processing efficiency of the processing unit 520.

Further, if the output data PQ is output by the reading request, the integration of the error of the output data PQ for the detection data PI at that time is performed, and the integration result value is retained in an internal register of the correction unit 120. In addition, the correction for the output data PQ output in the next reading request is performed based on the retained integration result value. Specifically, a comparison result value between the integration result value and a predetermined value is added to the detection data PI, the cut-down process of a fraction thereof is performed, and the result is output as the output data PQ in the next reading request. Thus, it is possible to suppress the integration error generated when the processing unit 520 performs the integration of the output data PQ to the minimum.

For example, first output data PQ1 (C1 in FIG. 16) corresponding to first detection data PI1 (A1 in FIG. 16) is imported in the processing unit 520 by the first reading request (B1 in FIG. 16), and second output data PQ2 (C2) corresponding to second detection data PI2 (A3) is imported in the processing unit 520 by the next second reading request (B2).

In this case, integration of an error of the first output data PQ1 (C1) for the first detection data PI1 (A1) is performed, and an integration result value is retained in the internal register of the correction unit 120. Further, correction based on the retained integration result value is performed for the second detection data PI2 (A3), and the second output data PQ2 (C2) subjected to the correction is output in the next second reading request (B2). That is, the integration result value of the error up to the previous time (when the first reading request is made) is reflected to the second output data PQ2. Accordingly, when the processing unit 520 performs the integration by the first and second output data PQ1 and PQ2, the error of the integration is reduced to the minimum.

As described above, in FIG. 16, the processing unit 520 can import the output data PQ at a free timing, and can reduce the error in the integration of the output data PQ to the minimum. When the output data PQ is the angular velocity data in the gyro sensor, the processing unit 520 can import the angular velocity data of 16 bits (n bits) that is the amount of bits smaller than 24 bits (m bits) from the detection device 20 at a free timing to perform the integration, to thereby calculate the angle data with high accuracy. The output data PQ is not limited to the angular velocity data, and other physical quantity data may be used.

However, in FIG. 16, at timings A1 to A8 that are the sampling timings of the digital filtering, the detection data PI output from the digital signal processing unit 110 is re-sampled at timings B1, B2, B3, and B4, and is output to the processing unit 520 as the output data PQ.

Further, if such re-sampling is performed, a harmonic component of an unnecessary signal is fold into a signal band of a desired signal, and an error due to the folding may occur in the output data PQ. Particularly, since the level of the unnecessary signal of the detuning frequency is relatively high, the component of the detuning frequency is folded into the signal band as it is without being attenuated, which causes a problem.

In this regard, in the present embodiment, the digital signal processing unit 110 performs the BEF processing for sufficient attenuation of the component of the detuning frequency. Accordingly, even when the re-sampling is performed as shown in FIG. 16, a negative influence due to folding can be reduced to the minimum. Accordingly, it is possible to compatibly realize the importing of the output data PQ at the free timing using the processing unit 520 and the reduction of the negative influence of the folding due to the re-sampling.

8. Multi-Axial Gyro Sensor

Figure 17:
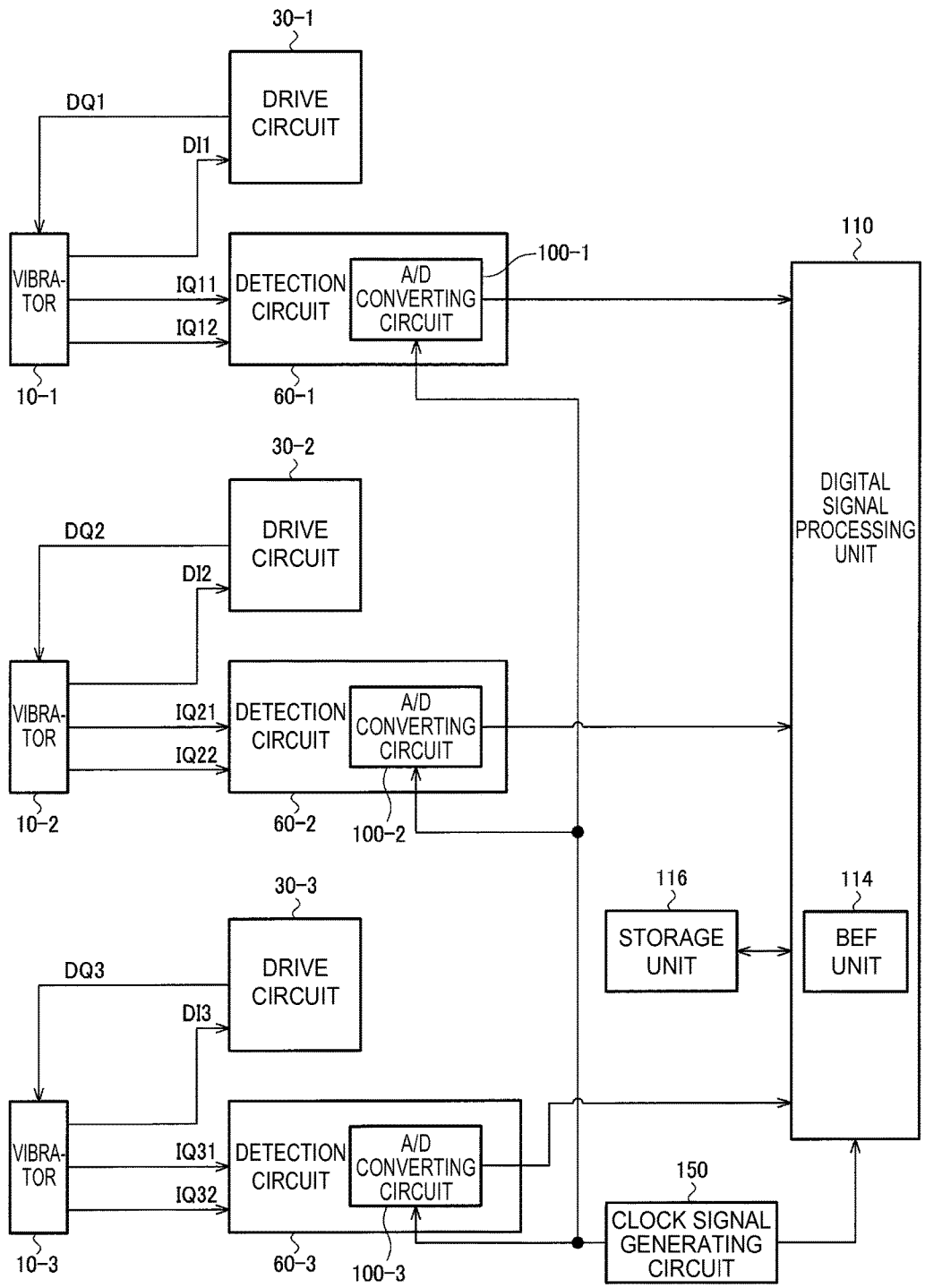
FIG. 17 is a diagram illustrating still another configuration example of the detection device.

FIG. 17 is a diagram illustrating a modification example of the detection device 20 of the present embodiment. FIG. 17 shows a configuration example of the detection device 20 of a multi-axial gyro sensor that detects a rotational angular velocity around plural axes. The detection device 20 having such a configuration example drives and detects plural vibrators 10-1, 10-2, and 10-3. Here, for example, the vibrator 10-1 (first vibrator) is a vibrator for detecting a rotational angular velocity around a first axis (for example, X axis), the vibrator 10-2 (second vibrator) is a vibrator for detecting a rotational angular velocity around a second axis (for example, Y axis), and the vibrator 10-3 (third vibrator) is a vibrator for detecting a rotational angular velocity around a third axis (for example, Z axis).

Further, in FIG. 17, a drive circuit 30-1 and a detection circuit 60-1 for the vibrator 10-1, and a drive circuit 30-2 and a detection circuit 60-2 for the vibrator 10-2 are provided. Further, a drive circuit 30-3 and a detection circuit 60-3 for the vibrator 10-3 are provided. FIG. 17 shows a case where three vibrators are provided, but when two vibrators are provided, the configuration of the drive circuit 30-3 and the detection circuit 60-3 for the vibrator 10-3 are not necessary.

The drive circuit 30-1 (first drive circuit) for the vibrator 10-1 receives a feedback signal DI1 (first feedback signal) from the vibrator 10-1, and outputs a drive signal DQ1 to drive the vibrator 10-1. The detection circuit 60-1 (first detection circuit) performs detection based on signals IQ11 and IQ12 from the vibrator 10-1, and outputs detection data (first detection data) to the digital signal processing unit 110. The detection data is data converted into digital data from analog data by an A/D converting circuit 100-1 of the detection circuit 60-1.

The drive circuit 30-2 (second drive circuit) for the vibrator 10-2 receives a feedback signal DI2 (second feedback signal) from the vibrator 10-2, and outputs a drive signal DQ2 to drive the vibrator 10-2. The detection circuit 60-2 (second detection circuit) performs detection based on signals IQ21 and IQ22 from the vibrator 10-2, and outputs detection data (second detection data) to the digital signal processing unit 110. The detection data is data converted into digital data from analog data by an A/D converting circuit 100-2 of the detection circuit 60-2.

The drive circuit 30-3 (third drive circuit) for the vibrator 10-3 receives a feedback signal DI3 (third feedback signal) from the vibrator 10-3, and outputs a drive signal DQ3 to drive the vibrator 10-3. The detection circuit 60-3 (third detection circuit) performs detection based on signals IQ31 and IQ32 from the vibrator 10-3, and outputs detection data (third detection data) to the digital signal processing unit 110. The detection data is data converted into digital data from analog data by an A/D converting circuit 100-3 of the detection circuit 60-3.

Since a detailed configuration and an operation of the drive circuits 30-1, 30-2, and 30-3 and the detection circuits 60-1, 60-2, and 60-3 are the same as in the drive circuit 30 and the detection circuit 60 in FIG. 2 or the like, the detailed description will not be repeated.

The digital signal processing unit 110 receives the detection data (first, second and third detection data) from the detection circuits 60-1, 60-2, and 60-3, and performs digital signal processing (BEF processing or the like) for each axis. A clock signal generating circuit 150 generates a clock signal (clock signal or frequency dividing signal) by a CR oscillation circuit or the like, and supplies the result as an operating clock signal of the digital signal processing unit 110 or the A/D converting circuit 100-1, 100-2, and 100-3.

In the multi-axial gyro sensor, a so-called inter-axis interference occurs. Accordingly, in the present embodiment, vibration (oscillation) frequencies of the vibrators 10-1, 10-2, and 10-3 on the respective axes are set to be different from each other. Specifically, the drive circuit 30-1 drives the vibrator 10-1 at a drive side resonance frequency fd1 (for example, 100 kHz). The drive circuit 30-2 drives the vibrator 10-2 at a drive side resonance frequency fd2 (for example, 110 kHz). The drive circuit 30-3 drives the vibrator 10-3 at a drive side resonance frequency fd3 (for example, 120 kHz). In this way, as the drive (vibration) frequencies of the vibrators 10-1, 10-2, and 10-3 corresponding to the respective axes are set to be different from each other, a negative influence due to the inter-axis interference is reduced.

However, if the vibrators 10-1, 10-2, and 10-3 corresponding to the respective axes are provided and the vibration frequencies thereof are set to be different from each other, detuning frequencies of the vibrators 10-1, 10-2, and 10-3 may have different characteristics (center frequency or variance).

Thus, in the present embodiment, the digital signal processing unit 110 performs BEF processing having different frequency characteristics (center frequency, half-power frequency or the like) for the respective vibrators 10-1, 10-2, and 10-3. Specifically, the digital signal processing unit 110 performs first BEF processing for attenuating a component of a detuning frequency $\Delta f1=|fd1-fs1|$ corresponding to a difference between the drive side resonance frequency fd1 and a detection side drive frequency fs1 of the vibrator 10-1 for the detection data from the detection circuit 60-1. Further, the digital signal processing unit 110 performs second BEF processing for attenuating a component of a detuning frequency $\Delta f2=|fd2-fs2|$ corresponding to a difference between the drive side resonance frequency fd2 and a detection side drive frequency fs2 of the vibrator 10-2 for the detection data from the detection circuit 60-2. The second BEF processing is different from the first BEF processing in the frequency characteristic. Further, the digital signal processing unit 110 performs third BEF processing for attenuating a component of a detuning frequency $\Delta f3=|fd3-fs3|$ corresponding to a difference between the drive side resonance frequency fd3 and a detection side drive frequency fs3 of the vibrator 10-3 for the detection data from the detection circuit 60-3. The third BEF processing is different from the first and second BEF processing in the frequency characteristic. In this way, the digital signal processing unit 110 performs the BEF processing having the different frequency characteristics by the vibrators 10-1 and 10-2. Further, the digital signal processing unit 110 performs the BEF processing having the different frequency characteristics by the vibrators 10-1, 10-2, and 10-3.

For example, the storage unit 116 stores information filter coefficients for setting a frequency characteristic of the BEF. Specifically, the storage unit 116 stores information on a first filter coefficient for setting the frequency characteristic of the first BEF and information on a second filter coefficient for setting the frequency characteristic of the second BEF. In addition, the storage unit 116 stores information on a third filter coefficient for setting the frequency characteristic of the third BEF.

The first filter coefficient is a coefficient corresponding to the characteristic of the detuning frequency $\Delta f1$ of the vibrator 10-1, and is a coefficient (a1, a2, b1 or k) for forming the BEF having the frequency characteristic (center frequency, half-power frequency or the like) for attenuating the detuning frequency $\Delta f1$. The second filter coefficient is a coefficient corresponding to the characteristic of the detuning frequency $\Delta f2$ of the vibrator 10-2, and is a coefficient for forming the BEF having the frequency characteristic for attenuating the detuning frequency $\Delta f2$. The third filter coefficient is a coefficient corresponding to the characteristic of the detuning frequency fd3 of the vibrator 10-3, and is a coefficient for forming the BEF having the frequency characteristic for attenuating the detuning frequency $\Delta f3$.

Further, when the processing for the vibrator 10-1 is performed, the digital signal processing unit 110 reads the information on the first filter coefficient from the storage unit 116, and performs filtering using the BEF in which the first filter coefficient is set for the detection data from the detection circuit 60-1 (A/D converting circuit 100-1). Further, when the processing for the vibrator 10-2 is performed, the digital signal processing unit 110 reads the information on the second filter coefficient from the storage unit 116, and performs filtering using the BEF in which the second filter coefficient is set for the detection data from the detection circuit 60-2 (A/D converting circuit 100-2). This is similarly applied to the processing of the vibrator 10-3.

With this configuration, even when the vibration frequencies (drive side resonance frequencies) of the vibrators 10-1, 10-2, and 10-3 are different from each other and the characteristics of the detuning frequencies are different from each other, it is possible to sufficiently attenuate the components of the detuning frequencies by the BEF having an appropriate frequency characteristic. Accordingly, the reduction of the inter-axis interference and the removal of the unnecessary signal of the detuning frequency can be compatibly realized.

For example, as a comparative example of the present embodiment, a method for removing an unnecessary signal of a detuning frequency using an analog filter (analog low pass filter or analog band pass filter) may be considered. However, in this method, in the multi-axial gyro sensor as shown in FIG. 17, when the vibration frequencies of the respective vibrators are different from each other to reduce the inter-axis interference, the analog filter that is individually designed corresponding to each vibrator should be prepared, which causes difficulties in design, product management or the like.

On the other hand, in the present embodiment, the component of the detuning frequency is attenuated by the BEF that is the digital filter. Accordingly, in the multi-axial gyro sensor as shown in FIG. 17, even when the vibration frequencies of the respective vibrators are different from each other, the information on the filter coefficient stored in the storage unit 116 can be appropriately set to handle the problem.

9. Detection Circuit

Figure 18:
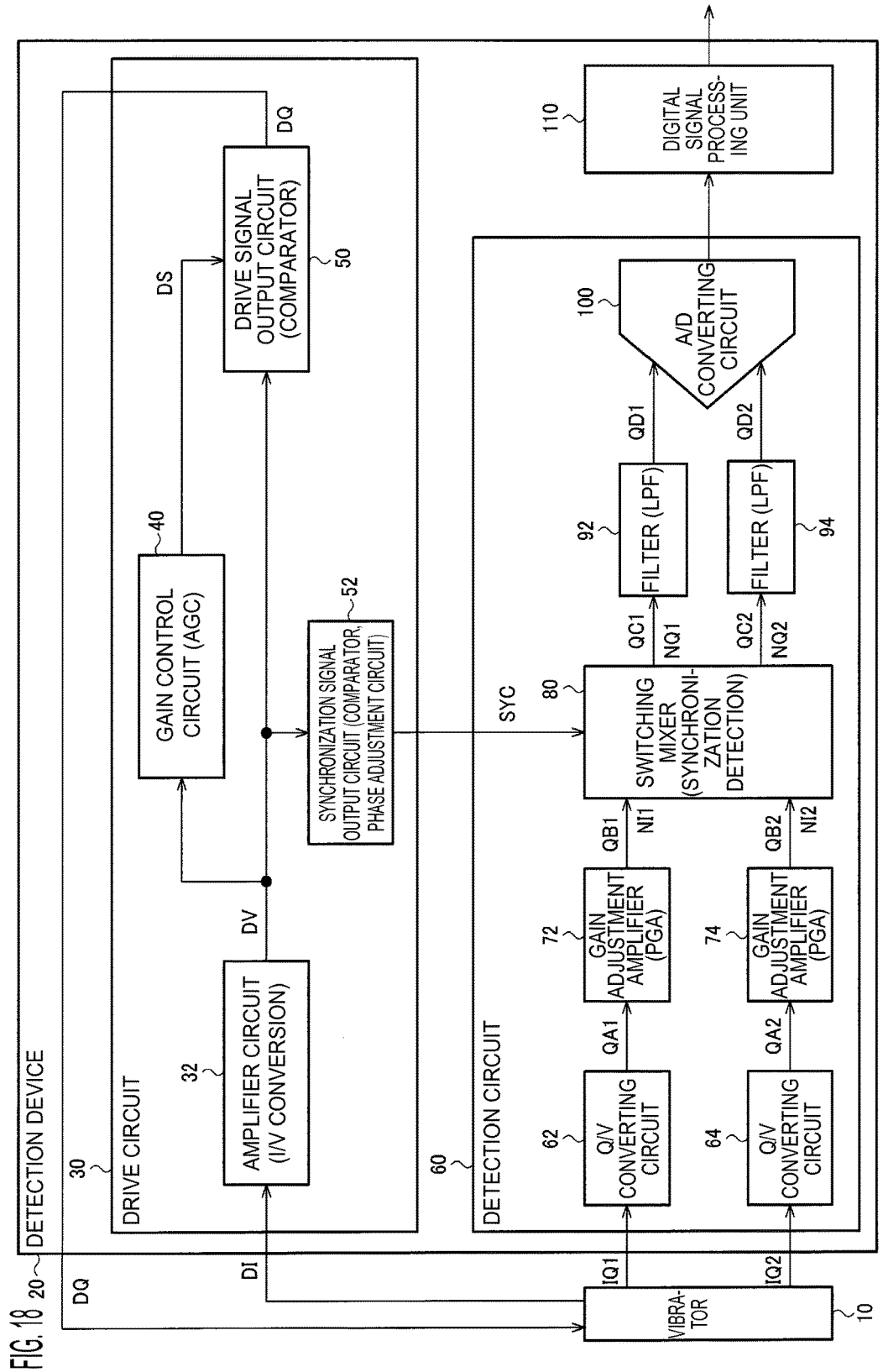
FIG. 18 is a configuration example of a detection device of a full differential switching mixer type.

FIG. 18 is a diagram illustrating a detailed configuration example of the detection circuit 60. FIG. 18 shows an example of the detection circuit 60 of a full differential switching mixer type.

The detection circuit 60 includes first and second Q/V converting circuits 62 and 64, first and second gain adjustment amplifiers 72 and 74, a switching mixer 80, first and second filters 92 and 94, and an A/D converting circuit 100. The detection circuit 60 is not limited to the configuration shown in FIG. 18, and various modifications such as an omission of a part of the components or an addition of other components may be made.

First and second differential detection signals IQ1 and IQ2 from the vibrator 10 are input to the Q/V converting circuits 62 and 64 (charge-voltage converting circuit). Further, the Q/V converting circuits 62 and 64 convert electric charges (current) generated in the vibrator 10 into voltage. The Q/V converting circuits 62 and 64 are continuous charge-voltage converting circuits having a feedback resistance.

The gain adjustment amplifiers 72 and 74 adjust gains of output signals QA1 and QA2 of the Q/V converting circuits 62 and 64 for amplification. The gain adjustment amplifiers 72 and 74 are so-called programmable gain amplifiers, and amplify the signals QA1 and QA2 using set gains. For example, the gain adjustment amplifiers 72 and 74 amplify the signals QA1 and QA2 to signals having amplitude suitable for a voltage converting range of the A/D converting circuit 100.

The switching mixer 80 is a mixer that performs differential synchronization detection based on the synchronization signal SYC from the drive circuit 30. Specifically, in the switching mixer 80, an output signal QB1 of the gain adjustment amplifier 72 is input to a first input node NI1, and an output signal QB2 of the gain adjustment amplifier 74 is input to a second input node NI2. Further, the switching mixer 80 performs differential synchronization detection using the synchronization signal SYC from the drive circuit 30, and outputs first and second differential output signals QC1 and QC2 through first and second output nodes NQ1 and NQ2. An unnecessary signal such as noise (1/f noise) generated by the circuits (Q/V converting circuit, gain adjustment amplifier) at the preceding stages is frequency-converted into a high frequency band by the switching mixer 80. Further, a desired signal that is a signal based on a Coriolis force is dropped down into a DC signal.

The first output signal QC1 from the first output node NQ1 of the switching mixer 80 is input to the filter 92. The second output signal QC2 from the second output node NQ2 of the switching mixer 80 is input to the filter 94. These filters 92 and 94 are low pass filters having a frequency characteristic of removing (attenuating) an unnecessary signal and transmitting a desired signal. For example, the unnecessary signal such as 1/f noise frequency-converted into the high frequency band by the switching mixer 80 is removed by the filters 92 and 94. Further, the filters 92 and 94 are passive filters configured by a passive element, for example. That is, as the filters 92 and 94, a passive filter configured by a passive element such as a resistor or a capacitor may be employed without using an operational amplifier.

The A/D converting circuit 100 receives an output signal QD1 from the filter 92 and an output signal QD2 from the filter 94, and performs differential A/D conversion. Specifically, the A/D converting circuit 100 performs sampling of the output signals QD1 and QD2 using the filters 92 and 94 as an anti-aliasing filter (prefilter) to perform the A/D conversion. Further, in the present embodiment, the output signal QD1 from the filter 92 and the output signal QD2 from the filter 94 are input to the A/D converting circuit 100 without through an active element.

As the A/D converting circuit 100, an A/D converting circuit of various types such as a delta-sigma type or a successive approximation type may be employed, for example. When employing the delta-sigma type, for example, an A/D converting circuit that has a function of correlated double sampling (CDS), a chopper or the like for reduction of 1/f noise and is configured by a secondary delta-sigma converter or the like may be used. Further, when employing the successive approximation type, for example, an A/D converting circuit that has a function of dynamic element matching (DEM) that reduces deterioration of the S/N ratio due to element variation of the DAC and is configured by a capacitance DAC and a successive approximation control logic may be used.

The digital signal processing unit 110 performs a variety of digital signal processing. For example, the digital signal processing unit 110 performs band limit digital filtering based on an application of a desired signal or digital filtering for removing noise generated by the A/D converting circuit 100 or the like. Further, the digital signal processing unit 110 performs digital correction such as gain correction (sensitivity adjustment) or offset correction.

In the detection device 20 shown in FIG. 18, the full differential switching mixer type is employed. According to the full differential switching mixer type, the 1/f noise or the like generated by the Q/V converting circuits 62 and 64, or the gain adjustment amplifiers 72 and 74 is removed by the frequency conversion in the switching mixer 80 and the low pass filter characteristic of the filters 92 and 94. Further, between the gain adjustment amplifiers 72 and 74 and the A/D converting circuit 100, the switching mixer 80 where the gain does not work but the 1/f noise is not generated and the filters 92 and 94 configured by a passive element with low noise are provided. Accordingly, since the noise generated by the Q/V converting circuits 62 and 64 or the gain adjustment amplifiers 72 and 74 is removed and the noise generated by the switching mixer 80 or the filters 92 and 94 is suppressed to the minimum, the signals QD1 and QD2 in a low noise state can be input to the A/D converting circuit 100 for A/D conversion. Furthermore, since the signals QD1 and QD2 can be A/D converted as the differential signals, the S/N ratio can be enhanced compared with a case where A/D conversion is performed using a single ended signal.

The detection device 20 of the present embodiment is not limited to the configuration of the full differential switching mixer type as shown in FIG. 18. For example, various configurations such as a direct sampling type configured by a detuning type Q/V converting circuit and an A/D converting circuit directly connected to the detuning type Q/V converting circuit may be employed.

Figure 19:
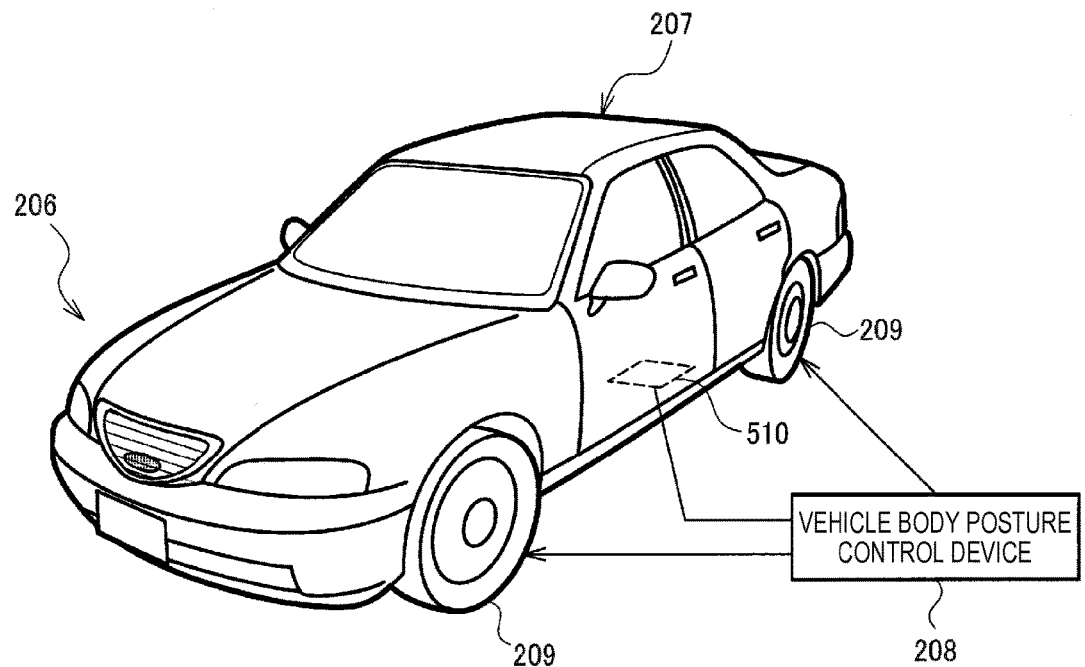
FIG. 19 is a diagram illustrating an example of a moving object to which the detection device of the present embodiment is applied.

FIG. 19 shows an example of a moving object including the detection device 20 of the present embodiment. The detection device 20 of the present embodiment may be assembled to various moving objects such as a vehicle, an airplane, a motorbike, a bicycle or a ship. The moving object is a device that includes a driving mechanism such as an engine or a motor, a steering mechanism such as a steering wheel or a rudder, and various electronic apparatuses, and moves on the ground, the sky or the sea. FIG. 19 schematically shows an automobile 206 as a specific example of the moving object. The automobile 206 is provided with a gyro sensor 510 (sensor) that includes the vibrator 10 and the detection device 20. The gyro sensor 510 may detect the posture of a vehicle body 207. A detection signal of the gyro sensor 510 may be provided to a vehicle body posture control device 208. The vehicle body posture control device 208 may control hardness of a suspension according to the posture of the vehicle body 207, or may control a brake of each vehicle wheel 209, for example. Further, this posture control may be used in various moving objects such as a bipedal walking robot, a flying machine or a helicopter. In order to realize the posture control, the gyro sensor 510 may be assembled.

Hereinabove, the embodiments of the invention have been described in detail, but it can be easily understood to those skilled in the art that various modifications can be made in a range without substantially departing from the novel contents and effects of the invention. Accordingly, such modifications should be construed to be included in the scope of the invention. For example, in the description and the drawings, a term (gyro sensor, angular velocity or the like) written at least one time together with a different term (sensor, physical quantity or the like) having a wider meaning or the same meaning can be exchanged with the different term in any location in the description and the drawings. Further, the configurations of the detection device, the sensor, the electronic apparatus, and the moving object, and the structure of the vibrator are not limited to the above-described embodiments, and various modifications may be realized.

The entire disclosure of Japanese Patent Application No. 2013-251778, filed Dec. 5, 2013 is expressly incorporated by reference herein.

What is claimed is:
1. A detection device comprising:
a drive circuit that receives a feedback signal from a vibrator and drives the vibrator;
a detection circuit that performs detection based on a signal from the vibrator and outputs detection data; and
a digital signal processing unit that performs digital filtering for the detection data from the detection circuit, the digital signal processing unit including a band elimination filtering circuit,
the band elimination filtering circuit comprising:
a multiplier;
a multiplication result register connected to the multiplier and configured to store multiplication result data of the multiplier;
an adder;
a first addition result register and a second addition result register connected to the adder and configured to store selectively addition result data of the adder;
a fifth selector connected to the multiplier and the adder and configured to select any one of the multiplication result data of the multiplier and the addition result data of the adder, and output;
an output register connected to the fifth selector and configured to store the output data of the fifth selector;
a first selector connected to an input and to the output register and configured to select any one of input data and the data of the output register, and output to the multiplier;
a second selector connected to a storage unit and configured to select any one of a plurality of filter coefficients stored in the storage unit, and output to the multiplier;
a third selector connected to the input and the multiplication result register and configured to select any one of the input data and data stored in the multiplication result register, and output to the adder; and
a fourth selector connected to the input, the first addition result register, and the second addition result register and configured to select any one of the input data and data stored in the first addition result register and the second addition result register, and output to the adder;
wherein the digital signal processing unit performs band elimination filtering, by way of the band elimination filtering unit, for attenuating a component of a detuning frequency $\Delta f=|fd-fs|$ corresponding to a difference between a drive side resonance frequency fd and a detection side resonance frequency fs of the vibrator for the detection data.

2. The detection device according to claim 1,
wherein the storage unit stores information on a plurality of filter coefficients so that each filter coefficient corresponds to a respective vibrator.

3. The detection device according to claim 1, the digital signal processing unit further comprising a band limit low pass filter unit, an input of the band elimination filtering unit directly connected to an output of the band limit low pass filter unit,
wherein the digital signal processing unit performs band limit low pass filtering, by way of the band limit low pass filter unit, in which a cutoff frequency is variable, and
when a variable range of the cutoff frequency of the low pass filter is represented as fca to fcb and a center frequency of the band elimination filter is represented as fm, a relationship of fca<fm<fcb is satisfied.

4. The detection device according to claim 1, further comprising:
an interface unit that outputs output data to the outside being asynchronous to an output timing of the detection data of the digital signal processing unit.

5. A sensor comprising:
the detection device according to claim 1; and
the vibrator.

6. A sensor comprising:
the detection device according to claim 1; and
the vibrator.

7. An electronic apparatus comprising the detection device according to claim 1.

8. A moving object comprising the detection device according to claim 1.

* * * * *